US012581001B2

(12) United States Patent
Song et al.

(10) Patent No.: US 12,581,001 B2
(45) Date of Patent: Mar. 17, 2026

(54) MOBILE TERMINAL

(71) Applicant: LG ELECTRONICS INC., Seoul (KR)

(72) Inventors: Insu Song, Seoul (KR); Hyeonung Jo, Seoul (KR); Jaewook Lee, Seoul (KR); Hyoyeol Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 295 days.

(21) Appl. No.: 18/272,924

(22) PCT Filed: Jan. 25, 2021

(86) PCT No.: PCT/KR2021/000971
§ 371 (c)(1),
(2) Date: Jul. 18, 2023

(87) PCT Pub. No.: WO2022/158622
PCT Pub. Date: Jul. 28, 2022

(65) Prior Publication Data
US 2024/0080383 A1 Mar. 7, 2024

(51) Int. Cl.
H04M 1/02 (2006.01)

(52) U.S. Cl.
CPC ....... *H04M 1/0237* (2013.01); *H04M 1/0268* (2013.01)

(58) Field of Classification Search
CPC ............. H04M 1/0268; H04M 1/0237; H04M 1/0249; G06F 1/1624; G06F 1/1652
See application file for complete search history.

(56) References Cited

U.S. PATENT DOCUMENTS 10,880,417 B1 12/2020 Song et al.
12,149,647 B2 * 11/2024 Song et al. ......... H04M 1/0235
(Continued)

FOREIGN PATENT DOCUMENTS

KR 1020100125552 12/2010
KR 1020150099668 9/2015
(Continued)

OTHER PUBLICATIONS

Korean Intellectual Property Office Application No. 10-2023-7021855, Office Action dated Feb. 18, 2025, 5 pages.
(Continued)

*Primary Examiner* — Curtis A Kuntz
(74) *Attorney, Agent, or Firm* — LEE, HONG, DEGERMAN, KANG & WAIMEY

(57) ABSTRACT

Disclosed is a mobile terminal including: a first frame; a second frame slidable in the first direction with respect to the first frame; a flexible display unit that is bent to surround a portion of the mobile terminal, wherein the flexible display unit includes a front surface whose area size is variable based on the slide movement of the second frame and a rear surface; a slide frame slidable on a rear surface of the second frame in the first direction or a second direction, wherein an end of the rear surface of the display unit is coupled to a rear surface of the slide frame; and a stopper that restricts a movement range of the slide frame in the first direction. The mobile terminal provides a flat screen even in an extended state by minimizing a lift phenomenon of a variable portion of the display unit.

16 Claims, 23 Drawing Sheets

(56) References Cited

U.S. PATENT DOCUMENTS

| | | | | |
|---|---|---|---|---|
| 2021/0405857 A1* | 12/2021 | Kim et al. | .......... | G06F 3/04845 |
| 2023/0176622 A1* | 6/2023 | Kim et al. | ........... | G06F 1/1652 |

FOREIGN PATENT DOCUMENTS

| | | |
|---|---|---|
| KR | 1020160141255 | 12/2016 |
| KR | 1020170027222 | 3/2017 |
| KR | 1020180040181 | 4/2018 |
| KR | 1020190018592 | 2/2019 |
| KR | 1020190101605 | 9/2019 |
| KR | 1020200124989 | 11/2020 |
| KR | 1020200129645 | 11/2020 |
| WO | 2020166769 | 8/2020 |

OTHER PUBLICATIONS

European Patent Office Application Serial No. 21921393.1, Search Report dated Jul. 11, 2024, 8 pages.
PCT International Application No. PCT/KR2021/000971, International Search Report dated Oct. 21, 2021, 11 pages.
Korean Intellectual Property Office Application No. 10-2023-7016498, Office Action dated Jun. 4, 2025, 5 pages.

* cited by examiner (a)

MOBILE TERMINAL

CROSS-REFERENCE TO RELATED APPLICATION(S)

This application is the National Stage filing under 35 U.S.C. 371 of International Application No. PCT/KR2021/000971, filed on Jan. 25, 2021, the contents of which is hereby incorporated by reference herein in its entirety.

TECHNICAL FIELD

The present disclosure relates to a mobile terminal, and more particularly, to a mobile terminal that has a flexible display and is capable of extending a size of a screen while the display is scrolled and slid at the same time.

BACKGROUND

Terminals may be generally classified as mobile/portable terminals or stationary terminals according to their mobility. Mobile terminals may also be classified as handheld terminals or vehicle mounted terminals according to whether or not a user can directly carry the terminal.

Functions of the mobile terminals are diversifying. For example, functions include data and voice communication, photo taking and video recording via a camera, voice recording, music file playback via a speaker system, and outputting of images or videos on a display unit. Some terminals have an electronic game play function added or perform a multimedia player function. In particular, recent mobile terminals may receive a multicast signal that provide visual content such as broadcasting and video or television programs.

As the functions are diversifying, such a terminal is implemented, for example, in a form of a multimedia player having complex functions such as taking the photos and recording the video, playing music or video files, playing games, and receiving broadcasts. Recently, a flexible display having sufficient elasticity and capable of large deformation has been developed. The size of a mobile terminal can be varied using the deformable nature of the flexible display. For the mobile terminal having such a variable structure, changing the size of the mobile terminal should be stably performed, and there is a need for a structure to support the extended display unit to maintain a flat state of the display unit.

SUMMARY

Technical Problem

The purpose of the present disclosure is to improve usability of a display unit by preventing a flexible display unit from lifting.

Technical Solutions

Provided is a mobile terminal whose size is variable in a first direction including: a first frame; a second frame slidable in the first direction or in a second direction opposite to the first frame; a flexible display unit that is bent to surround a portion of the mobile terminal, wherein the flexible display unit includes a front surface located at a front surface of the mobile terminal and a rear surface located at a rear surface of the mobile terminal; the flexible display unit having the front surface whose area size is variable based on the slide movement of the second frame; a slide frame slidable on a rear surface of the second frame in the first direction or the second direction corresponding to the slide movement of the second frame, wherein an end of the rear surface of the display unit is coupled to a rear surface of the slide frame; and a stopper that restricts a movement range of the slide frame in the first direction.

The stopper may include: a first slide stopper protruding from an end of the slide frame in a third direction perpendicular to the first direction; and a first fixed stopper positioned adjacent to the second frame in the first direction, and, when the first slide stopper and the first fixed stopper come into contact with each other, the movement of the slide frame in the first direction may be restricted.

The second frame may include a side portion positioned at an end thereof in the third direction and a slide rail formed on the side portion and extending in the first direction, the slide frame may include a first slide hook inserted into the slide rail and moving along the slide rail, and the first slide stopper may be located rearwardly of the first slide hook.

The mobile terminal may further include a rolling hinge configured to support the display unit and bendable in the first direction corresponding to the bending of the display unit, and the rolling hinge may include, at an end thereof, a second slide hook inserted into the slide rail and moving along the slide rail.

The slide rail may include a pair of straight rails disposed so as to be spaced apart from each other in a thickness direction of the mobile terminal and a curved rail configured to connect the pair of straight rails to each other, and the first fixed stopper may be more biased in the second direction than an end of the straight rail in the first direction.

The second frame may further include a side frame covering a curved surface of the flexible display unit and positioned at an end in the first direction of the second frame, and the first fixed stopper may be an end of the side frame in the second direction.

The mobile terminal may further include a rivet rail formed on the second frame and extending in the first direction, and a guide rivet protruding from a front surface of the slide frame and moving along the rivet rail when the slide frame slides, and the stopper may include a second slide stopper more biased in the first direction than the guide rivet, wherein the second slide stopper restricts the movement of the slide frame in the first direction when in contact with an end of the rivet rail in the first direction.

The guide rivet may include a body having a diameter smaller than a width of the rivet rail, and a wing extended from an end of the body and having a diameter greater than the width of the rivet rail.

The second slide stopper may protrude in the first direction more than the wing, and may further include a second fixed stopper protruding in a forward direction of the mobile terminal at the end of the rivet rail in the first direction.

Advantageous Effects

The mobile terminal according to the present disclosure may adjust the size of a screen according to the need, thereby satisfying both portability and utility.

The mobile terminal according to the present disclosure may prevent the display from being damaged since stress is not concentrated at a specific point of the display.

The mobile terminal may prevent the display from being wavy when the second frame moves, that is, keep the flatness of the display when the second frame moves.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

BRIEF DESCRIPTION OF THE DRAWINGS

FIGS. 4 and 5 are exploded perspective views of the mobile terminal in accordance with an embodiment;

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
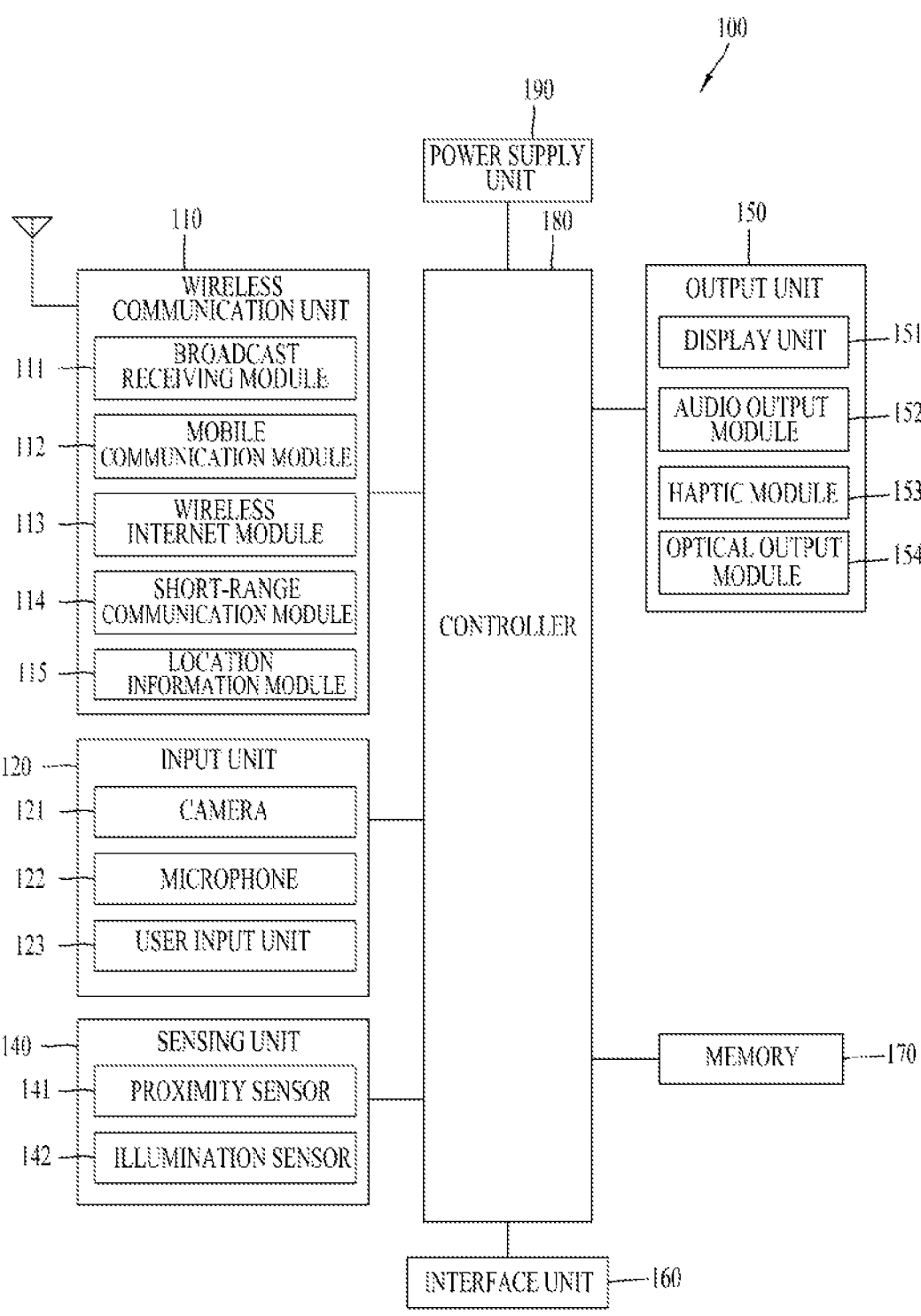
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above with reference to FIG. 1. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
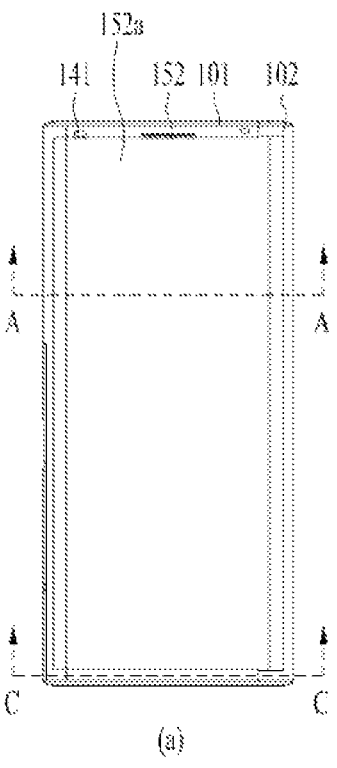
FIG. 2 is a front view of a first state and a second state of the mobile terminal in accordance with an embodiment.
Figure 2:
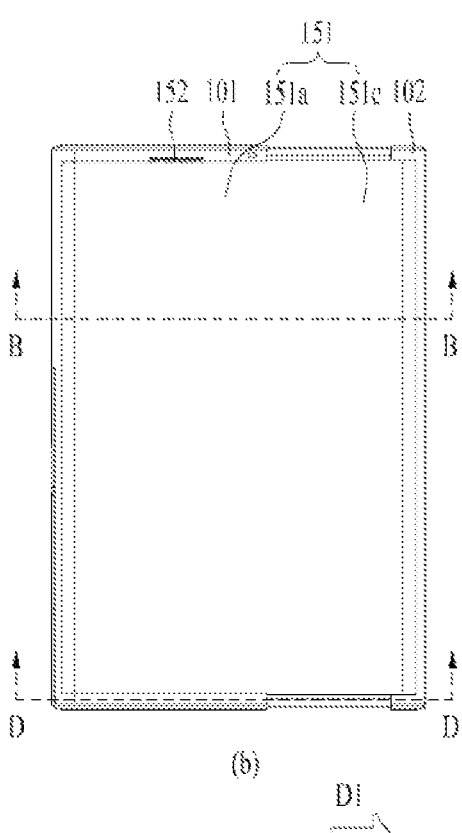
Figure 3:
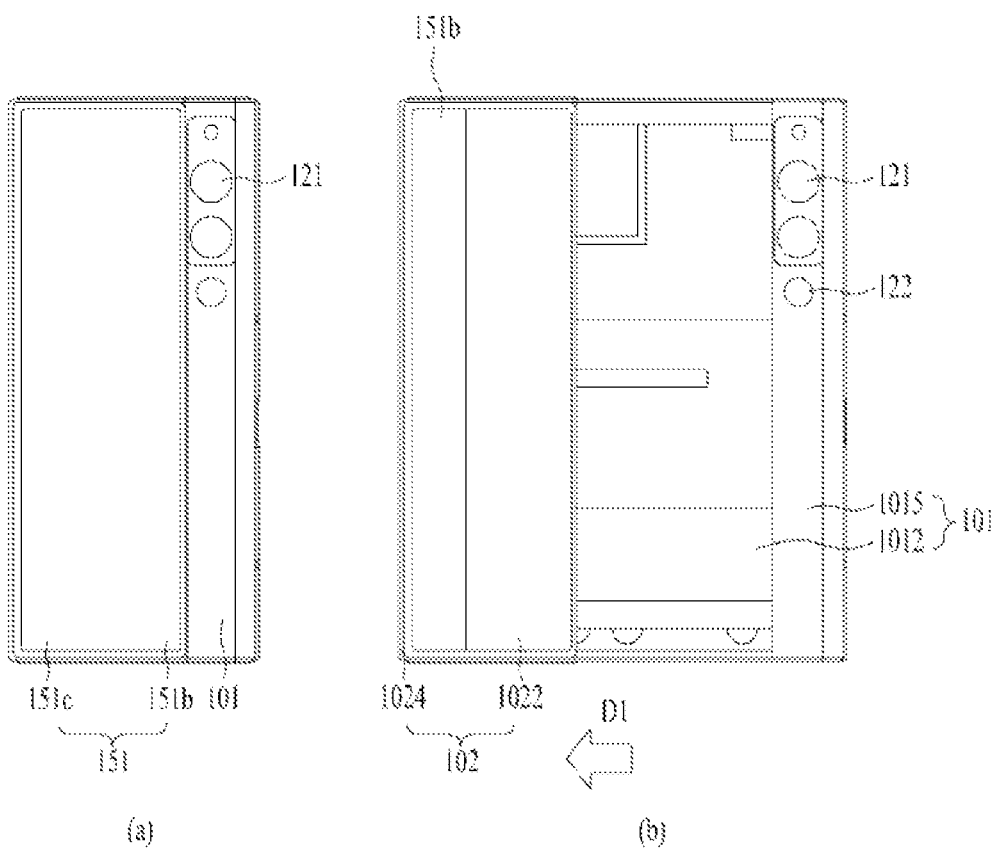
FIG. 3 is a rear view of the first state and the second state of the mobile terminal in accordance with an embodiment.

FIG. 2 is a front view of a first state and a second state of the mobile terminal in accordance with an embodiment, and FIG. 3 is a rear view of the first state and the second state of the mobile terminal in accordance with an embodiment. FIGS. 2(a) and 3(a) are views showing the first state in which the mobile terminal is contracted, and FIGS. 2(b) and 3(b) are views showing the second state in which the mobile terminal is extended.

As shown in the figures, the mobile terminal 100 in the first state is in a contracted position, and has a smaller size than the mobile terminal 100 in the second state. In addition, the size of the display unit 151 positioned on the front of the mobile terminal 100 is also smaller than in the second state. The mobile terminal 100 in the first state may be extended in a first direction D1 to switch to the second state. In the second state, as shown in FIG. 2(b), the size of the mobile terminal 100 and the size of the display unit 151 positioned on the front of the mobile terminal 100 are larger than in the first state, while the size of the display unit 151 positioned on the rear of the mobile terminal 100 is reduced as shown in FIG. 3(b). That is, a part of the display units 151 positioned on the rear of the mobile terminal 151 in the first state moves to the front of the mobile terminal 100 in the second state.

In the following description, the direction in which the mobile terminal 100 and the display unit 151 thereof are extended or enlarged is defined as a first direction D1, and the direction in which the mobile terminal contracts or retracts or is reduced to switch from the second state to the first state is defined as a second direction D2. A direction perpendicular to the first and second directions D1 and D2 is defined as a third and fourth directions. Description will be made on the assumption that the first and second directions are horizontal directions and the third and fourth directions are vertical directions. However, depending on the arrangement of the mobile terminal 100, the first and second directions may be vertical directions and the third direction may be a horizontal direction.

As such, a flexible display unit 151 which is bendable may be used as the display unit such that the position of the display unit may be varied. The flexible display unit 151 may be a display unit capable of maintaining a flat state like a conventional flat panel display and capable of warping, bending, folding, twisting, or rolling like paper. The flexible display unit 151 refers to a display which is manufactured on a thin and flexible substrate and is thus lightweight and robust as not to be easily broken. The flexible display unit according the present disclosure may be bent in a specific direction, and may be arranged such that the curvature thereof may change in the first direction.

In addition, an electronic paper is a display technology to which properties of general ink are applied. The electronic paper may be different from the conventional flat panel display in using reflected light. The electronic paper may change information using a twisted ball or electrophoresis using a capsule.

In a state in which the flexible display unit 151 is not deformed (e.g., a state of having an infinite curvature radius, hereinafter referred to as a basic state), a display region of the flexible display unit 151 becomes flat. In a state in which the flexible display unit 151 is deformed by an external force from the basic state (e.g., a state of having a finite radius of curvature, hereinafter referred to as a deformed state), the display region may become a curved face. As shown, information displayed in the deformation state may be visual information output on the curved face. Such visual information is implemented by independently controlling light emission of sub-pixels arranged in a matrix. The sub-pixel refers to a minimum unit for implementing one color. When external force is applied to the flexible display unit 151, the flexible display unit 151 may be deformed to switch from the default state, which is the flat state, to a bent state, which is not the flat state.

The flexible display unit 151 may be combined with a touch sensor to implement a flexible touch screen. When a touch is made on the flexible touch screen, the controller 180 (see FIG. 1) may perform control corresponding to such touch input. The flexible touch screen may be configured to detect the touch input in the deformed state as well as in the basic state.

The touch sensor detects the touch (or touch input) applied on the touch screen using at least one of various touch schemes such as a resistive film scheme, a capacitance scheme, an infrared scheme, an ultrasonic wave scheme, a magnetic field scheme, and the like.

As an example, the touch sensor may be configured to convert a change in pressure applied on a specific portion of the touch screen, capacitance generated at the specific portion, or the like into an electrical input signal. The touch sensor may be configured such that a touch object applying a touch on the touch screen may detect touched position and area on the touch sensor, a pressure during the touch, a capacitance during the touch, and the like.

Further, the mobile terminal 100 may have a deformation detection means for detecting the deformation of the flexible display unit 151. Such deformation detection means may be included in the sensing unit 140 (see FIG. 1).

The deformation detection means may be disposed in the flexible display unit 151 or a case (first to second frames 101 to 102 to be described later) to detect information related to the deformation of the flexible display unit 151. In this connection, the information related to the deformation may include a direction in which the flexible display unit 151 is deformed, a degree of the deformation, a deformed position, a deformed time, an acceleration at which the deformed flexible display unit 151 is restored, and the like. In addition, the information related to the deformation may include various kinds of information that may be detected due to the bending of the flexible display unit 151.

In addition, the controller 180 may change information displayed on the flexible display unit 151 or generate a control signal for controlling a function of the mobile terminal 100 based on the information related to the deformation of the flexible display unit 151 detected by the deformation detection means.

The deformation of the flexible display unit 151 may vary depending on the positions of the first frame 101 and the second frame 102. As shown in FIG. 2, since the bending position on the flexible display unit 151 is determined according to the positions of the first frame and the second frame, the bending deformation position of the flexible display unit 151 and the area thereof positioned on the front may be calculated based on the positions of the first frame 101 and the first frame 102 in place of the deformation detection means of the flexible display unit 151.

The state conversion (first or second state) of the flexible display unit 151, i.e., the size change at the front and rear faces of the mobile terminal 100 of the display unit 151 based on the size change of the mobile terminal 100 may be performed manually by a force applied by the user, but may be not limited to such manual scheme. For example, when the mobile terminal 100 or the flexible display unit 151 is in the first state, the mobile terminal 100 or the flexible display unit 151 may be converted into the second state by the user or an application command without the external force applied by the user. As such, in order for the flexible display unit 151 to be automatically deformed without the external force, the mobile terminal 100 may include a driving unit 200, which will be described later.

The flexible display unit 151 of the present disclosure is bent 180 degrees by rolling around a side portion of the mobile terminal 100 facing in the first direction. Accordingly, based on the side portion of the mobile terminal 100, a part of the flexible display unit 151 is disposed on the front of the mobile terminal 100, and the other part of the flexible display unit 151 is disposed on the rear of the mobile terminal 100. For simplicity, the part of the flexible display unit 151 positioned on the front is called a front face, and the other part of the flexible display unit 151 positioned on the rear is called a rear face. As illustrated in FIG. 2, the mobile terminal may extend in the first direction or contract in the second direction opposite to the first direction. In this case, the area of the flexible display unit 151 positioned on the front changes. That is, the sizes of the front face and the rear face may be changed according to a change in the state of the mobile terminal.

The part of the flexible display unit 151 positioned on the front of the mobile terminal 100 may be immovably fixed to the front surface of the first frame 101, and the other part thereof positioned on the rear of the mobile terminal 100 may be movably arranged on the rear of the mobile terminal 100.

In addition, the flexible display unit 151 may be rolled on or released at the side portion in the first direction of mobile terminal. Accordingly, the rear face of the display unit 151 moves, so that the size of the front face of the display unit 151 may be adjusted. Since the size of the flexible display unit 151 is determined and the flexible display unit 151 is formed of one continuous body, an area of rear face of the display unit 151 decreases as an area of the front face of the display unit 151 increases. Such a display unit 151 may be rolled in a second frame 102, which is movable relative to a first frame 101 to be described later, more correctly, on one of sides of the second frame 102. The display unit 151 may be withdrawn or pulled out from or inserted or pushed into the second frame 102 while being rolled in the second frame 102 along a moving direction of the second frame 102 to adjust the area of the display unit 151 on the front face of the mobile terminal 100. Such operation will be described in more detail below along with other relevant components of the mobile terminal 100.

Typically, an antenna is disposed in the case or the housing of the mobile terminal 100, but a portion where the antenna is installed in the case or the housing may be limited because of the flexible display unit 151 that covers not only the front face of the mobile terminal 100 but also the rear face thereof. For this reason, the antenna may be implemented on the flexible display unit 151. An antenna on display (AOD) is an antenna in which a transparent film is formed by stacking an electrode layer and a dielectric layer that have patterns engraved thereon, respectively. The antenna on display may be implemented thinner than an antenna implemented using a laser direct structuring (LDS) technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

Figure 4:
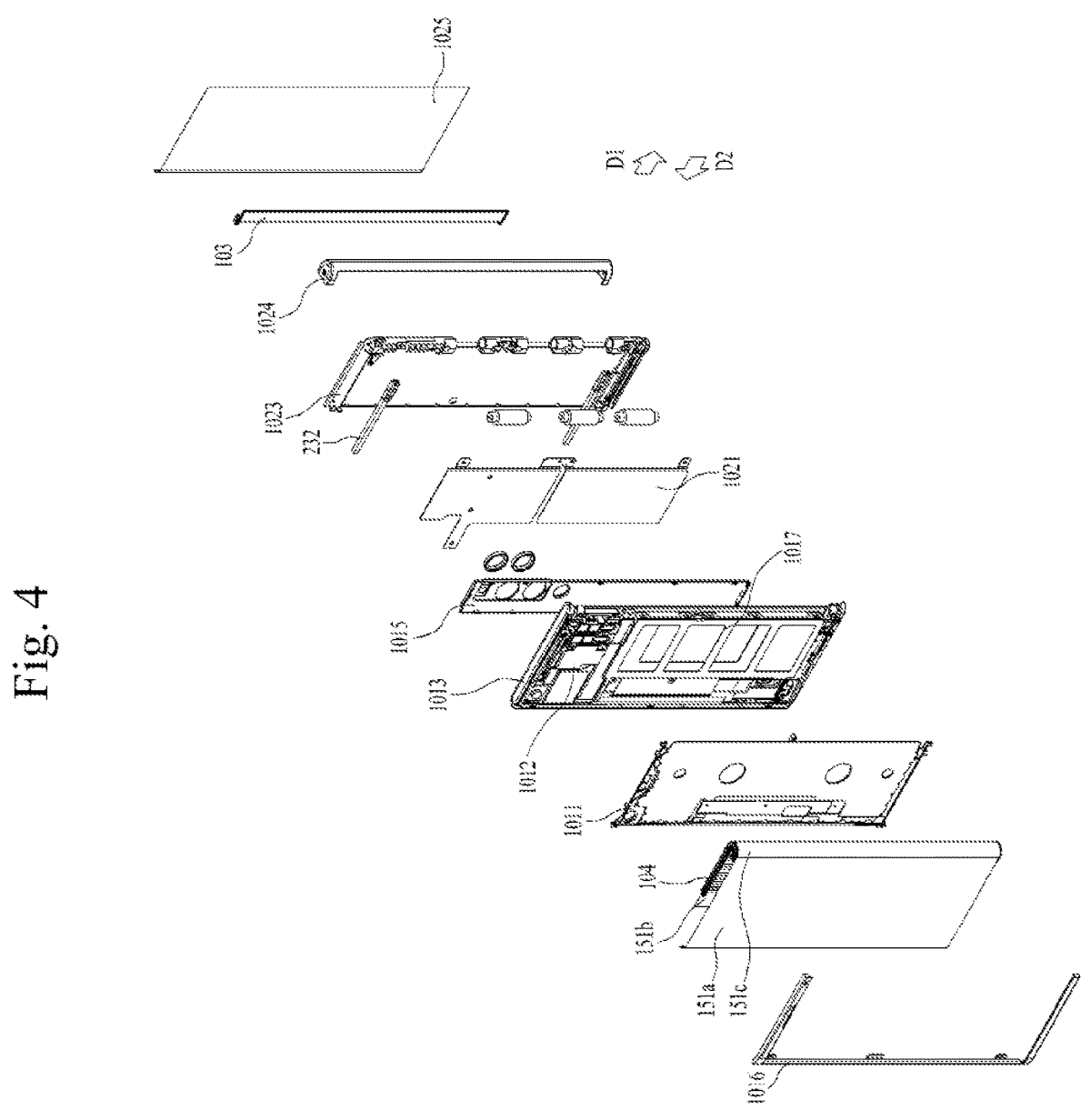
Figure 5:
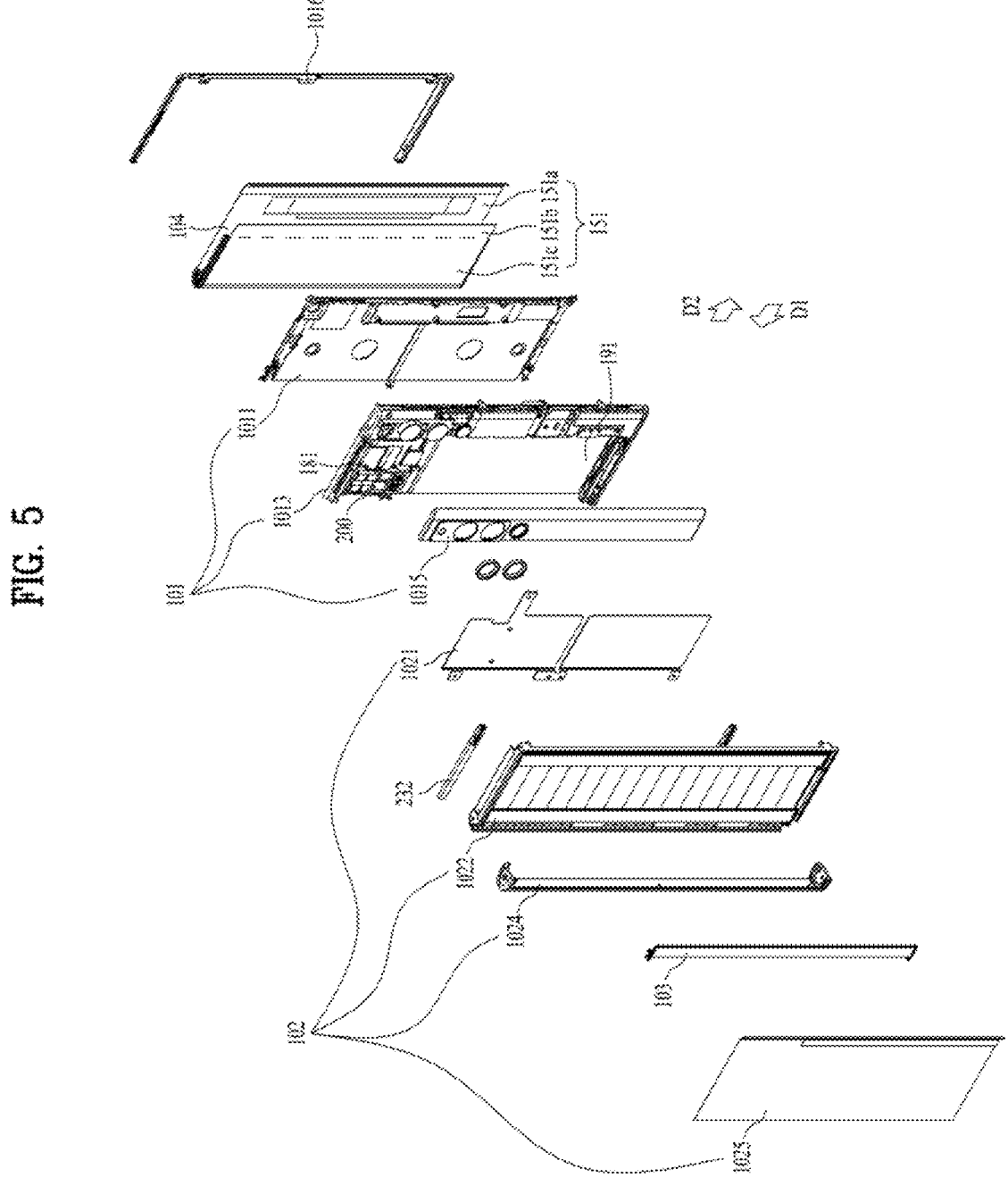

FIGS. 4 and 5 are exploded perspective views of the mobile terminal in accordance with an embodiment. FIG. 4 is an exploded perspective view of the mobile terminal as viewed from the front side, and FIG. 5 is an exploded perspective view of the mobile terminal as viewed from the rear side.

The mobile terminal 100 of the present disclosure includes frames 101 and 102 in which components are mounted, and the frames 101 and 102 of the present disclosure may vary in size in the first direction as shown in FIG. 2. One or more frames 101 and 102 move relative to each other, and sizes thereof may vary in the first direction. Electronic components are mounted in the frames 101 and 102, and the flexible display unit 151 is located out of the frames 101 and 102.

Since the mobile terminal 100 of the present disclosure includes the flexible display unit 151, the flexible display unit 151 may be combined in a form surrounding front faces and rear faces of the frames 101 and 102. The frame may include the first frame 101 and the second frame 102 moving in the first direction with respect to the first frame 101. The first frame 101 and the second frame 102 include front portions, a rear portions, and side portions, respectively, and are coupled to each other.

First, the first frame 101 corresponds to a main body of the mobile terminal 100, and may have a space between the first front portion 1011 and the first rear portion 1012 therein for accommodating various components. In addition, the first frame 101 may accommodate the second frame 102 movably coupled to the first frame 101 in such a space. More specifically, as shown in FIGS. 2 and 5, the first frame 101 may include a first front portion 1011 disposed at a front portion of the mobile terminal 100 and supporting the front face of the display unit 151 and a first rear portion 1012 disposed at a rear portion of the mobile terminal and on which various components are mounted. A front deco 1016 may cover front edges of the first area 151a to protect the edges of the first area 151a.

The first front portion 1011 and the first rear portion 1012 may be spaced apart from each other at a predetermined spacing to define a predetermined space therebetween, and may be connected to each other by a first side portion 1013. The first side portion 1013 may be integrally formed with the first rear portion 1012 or the first front portion 1011. The camera 121, the audio output module 152, and the input/output terminal, the controller 180, and the power supply unit 190 may be accommodated as components of the mobile terminal 100 in the space in the first frame 101. For example, the controller 180 may be a circuit board 181 including a processor and an electronic circuit for controlling the operation of the mobile terminal, and the power supply unit 190 may be a battery 191 and related components. In addition, the driving unit 200 that controls the slide movement of the second frame 102, which will be described later, may also be accommodated in the first frame 101.

As described above, the display unit 151 has the continuous body, and thus, may be disposed on both the front face and the rear face of the mobile terminal 100 while being rolled in the mobile terminal 100. The display unit 151 may include the front face positioned at the front face of the mobile terminal 100, the rear face positioned at the rear face of the mobile terminal 100, and the side face positioned between the front face and the rear face thereof and surrounding the side face of the mobile terminal. The front face and the rear face of the display unit 151 are flat, and the side face of the display unit 151 may form a curved face. The flexible display unit 151 may be damaged when being bent at an angle. Thus, the flexible display unit 151 may be formed to be bent with a predetermined curvature at the side face.

The display unit 151 may be divided into a fixed portion 151a and 151b and a variable portion 151c. The fixed portion 151a and 151b means a portion fixed to the frame. Because of being fixed to the frame, the fixed portion 151a and 151b maintains a constant shape without changing a bending degree. On the other hand, the variable portion 151c means a portion in which a bending angle or a position of the bent portion changes. The variable portion 151c in which the position or bending angle of the bent portion changes requires a structure for supporting a rear face of the variable portion 151c in response to the change.

The fixed portion 151a, 151b is coupled to the first frame of the display unit and is always positioned on the front face of the display unit to form a portion of the front face of the display unit. The variable portion 151c includes a side face located at a side portion of the mobile terminal, and a position of the side face varies depending on the position of the second frame. Based on a side face, an area of a portion disposed on the front face of the display unit and an area of a portion disposed on the rear face of the display unit vary. That is, a portion of the variable portion 151c may be the front face and another portion of the variable portion 151c may be the rear face based on the first and second states. The variable portion 151c is positioned in the first direction with respect to the fixed portion 151a, 151b relative to the mobile terminal, and an end of the variable portion 151c is bent toward the rear face of the mobile terminal and slides on the rear face of the second frame.

The end of the variable portion of the display unit is coupled with a slide frame that guides the variable portion to slide move on the rear face of the second frame, and the slide frame moves in the first direction at the same time as the second frame moves in the first direction. As a result, a moving distance of the slide frame with respect to the first frame is twice as a moving distance of the second frame with respect to the first frame. Further, as shown in FIG. 3, the first rear portion 1012 of the mobile terminal 100 includes an exposed rear portion 1015 that is exposed to the outside without being covered by the display unit 151 even in the first state. The physical input unit 120 for the manipulation of the mobile terminal 100 such as various buttons, switches, the camera 121, and a flash, and the sensing unit 140 such as the proximity sensor 141 or a fingerprint sensor may be arranged on the exposed rear portion 1015. The first rear portion 1012 except for the exposed rear portion 1015 may be covered by the display unit 151 in the first state as shown in FIG. 3(a), and may be exposed rearward in the second state as shown in FIG. 3(b).

In a conventional bar-shaped terminal, a display unit is provided only on a front face of the terminal. Therefore, a main camera is placed on a rear face of the terminal in order for the user to capture an object at an opposite side while looking through the display unit. On the other hand, an additional auxiliary camera is required to be disposed on the front face of the terminal in order for the user to capture himself or herself while viewing himself or herself through the display unit.

In the mobile terminal 100 of the present disclosure, on the other hand, the display unit 151 is arranged on both the front and rear of the mobile terminal 100. Accordingly, when a user photographs himself, a portion of the display unit 151 positioned on the same surface as the camera 121, that is, the rear face of the display unit 151 may be used. When the user takes a photograph of an object around the user, a portion of the display unit 151 on the side facing away from the camera 121, that is, the front face of the display unit 151 may be used. For this reason, the mobile terminal 100 may take a photograph of the user or an object located around the user using one camera 121. The camera may include a plurality of cameras having different angles of view, such as wide angle, ultra wide angle, and telephoto angle. Not only the camera but also a proximity sensor and an audio output unit may be disposed on the exposed rear portion 1015, and an antenna may be installed on the rear portion 1015. The rear portion 1015 may be used to protect the camera, the sensor, or the like on the exposed rear portion 1015 and not to deteriorate the exterior design. A portion of the rear portion 1015 corresponding to the camera 121 or the sensor 140 may be configured to be transparent, and the other portion thereof may have a predetermined pattern or color in consideration of design aspects without exposing internal parts.

The first side portion 1013 may extend along the edges of the first front portion 1011 and the first rear portion 1012 to surround the circumference of the first frame 101 and may define the appearance of the mobile terminal 100. However, as mentioned above, the second frame 102 is accommodated in and movably coupled to the first frame 101, and therefore a portion of the first frame 101 needs to be open to allow movement of the second frame 102 relative to the first frame 101. As an example, as best shown in FIG. 2, the second frame 102 may be movably coupled to a side of the first frame 101 facing in the first direction, and accordingly the first side portion 1013 may not be formed on the lateral surface facing in the first direction such that the lateral surface is open. Since the first side portion 1013 is exposed to the outside of the mobile terminal 100, the interface unit 160 for connecting a power port or an ear jack or the user input unit 120, such as a volume control button, may be disposed on the first side portion 1013. When the first side portion 1013 contains a metal material, the first side portion 1013 may serve as an antenna.

The second frame 102 may include a second front portion 1021 disposed at the front portion of the mobile terminal 100 and a second rear portion 1022 disposed at the rear portion of the mobile terminal 100. Like the first front portion 1011 and the first rear portion 1012 of the first frame 101, the second front portion 1021 and the second rear portion 1022 may be formed of plate-shaped members that are generally flat. In addition, the second frame 102 also accommodates various components, and must not interfere with the components accommodated in the first frame 101 during the movement. Accordingly, the second front portion 1021 and the second rear portion 1022 may be coupled to each other in a state of being spaced apart from each other to define a predetermined space therebetween, and may have shapes that do not interfere with the components in the first frame 101.

Figure 6:
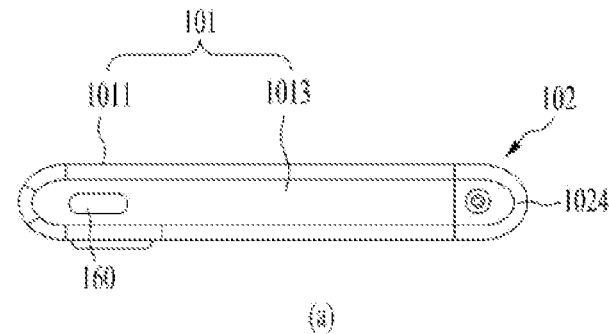
FIG. 6 is a side view of the mobile terminal as viewed from a third direction.
Figure 6:
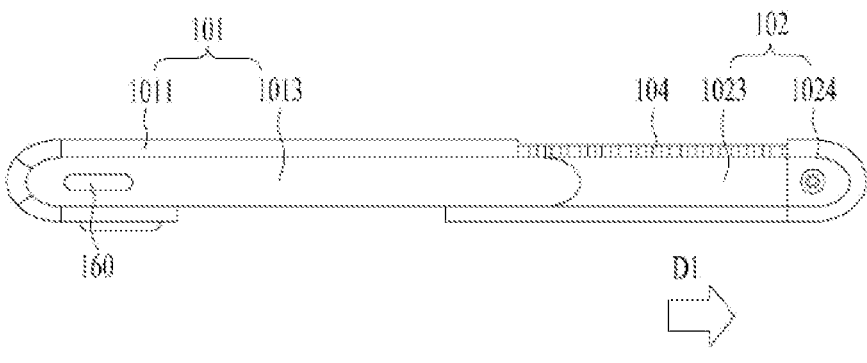

FIG. 6 is a side view of the mobile terminal as viewed from a third direction. FIG. 6 shows the first side portion 1013 of the first frame 101 and a second side portion 1023 of the second frame 102. Since the flexible display unit 151 is positioned at an end of the second frame 102 facing in the first direction, the end of the second frame 102 facing in the first direction should not be exposed to the outside. An end of the second frame 102 facing in the second direction should be open so as not to interfere with the first frame 101. In the first state, the second side portion 1023 of the second frame 102, which is positioned on the side facing in the third direction (which refers to the upward or downward direction in the drawing or may include both the upward and downward directions), may not be exposed to the outside because it overlaps the first side portion 1013 of the first frame. However, in the second state, it may be exposed to the outside because the second frame 102 is drawn out.

In addition, the display unit 151 may be bent 180 degrees while being rolled in the second frame 102 to be disposed on both the front face and the rear face of the mobile terminal 100. For such an arrangement of the display unit 151, the second frame 102 may include a roller 210 rotatably disposed therein. The roller 210 may be disposed at any position inside the second frame 102. However, the display unit 151 should be spread flat on the front face and the rear face of the mobile terminal 100 to provide a good quality screen to the user. Further, for such spread, a proper tension must be provided on the display unit 151. In order to provide the proper tension, the roller 210 may be disposed at a first directional end of the second frame 102. The roller 210 may extend in the third direction, and may be rotatably coupled to the second frame 102.

The display unit 151 may be rolled around the roller 210 while being gently bent with a predetermined curvature. The flexible display unit 151 may include a first face on which a video is output and exposed to the outside and an inner face facing the frame at the opposite side. The roller 210 may be installed to rotate freely in the second frame 102 while being in contact with the inner face of the display unit 151. Accordingly, the roller 210 may actually move the display unit 151 in a lateral direction of the mobile terminal 100, that is, in a direction perpendicular to a longitudinal direction. As will be described later, when the second frame 102 slides, because of the tension applied by the second frame 102, the display unit 151 moves to the front face or the rear face of the mobile terminal 100 in different directions (i.e., the first direction D1 or the second direction D2) relative to the second frame 102. The roller 210 may guide such movement while rotating.

The roller 210 may be disposed adjacent to the end of the second frame 102 that faces in the first direction. A side frame 1024 may be disposed at the end of the second frame 102 facing in the first direction to prevent damage to the display unit 151 rolled around the roller 210.

The side frame 1024 may extend in the longitudinal direction (the third direction) of the second frame 102 to cover the side portion facing in the first direction, thereby protecting the roller 210 and the display unit 151 rolled therearound.

Since the side face are wound by roller, the side face are bent with a predetermined curvature, and the inner surface of the side frame may include a curved surface corresponding to the curvature of the side face.

The side frame 1024 may substantially define the appearance of the mobile terminal 100 in cooperation with the first side portion 1013 of the first frame 101. In addition, the side portion of the second frame 102 that faces in the second direction may be omitted to minimize interference with the components arranged in the first frame 101 during movement.

During the expansion and the contraction in such first and second directions D1 and D2, the second frame 102 may overlap the first frame 101, more precisely, the first front portion 1011 and the first rear portion 1012 thereof so as not to interfere with the first frame 101. More specifically, the display unit 151 may be coupled to and supported by the first front portion 1011 of the first frame 101, as described above. Accordingly, the display unit 151 does not need to be additionally supported by the second front portion 1021 of the second frame 102. Rather, when the second front portion 1021 is interposed between the first front portion 1011 and the display unit 151, the display unit 151 may be deformed or damaged because of friction with the second front portion 1021, which is repeatedly moved. Thus, the second front portion 1021 may be disposed below the first front portion 1011, or may be interposed between two first front portions 1011. The second rear portion 1022 of the second frame 102 may be disposed rearward of the first rear portion 1012 of the first frame 101. That is, the front face of the second rear portion 1022 may face the rear face of the first rear portion 1012. In addition, the rear face of the first rear portion 1012 may be in contact with the front face of the second rear portion 1022 to stably support the movement of the second frame 102. Because of such arrangement, the second rear portion 1022 may be exposed to the outside of the first frame, more precisely, of the first rear portion 1012, and may be coupled to the display unit 151.

In addition, the second frame 102 may extend and contract in the first and second directions D1 and D2 to change the size of the mobile terminal 100, particularly, to extend or contract the front face of the mobile terminal 100. Thus, the display unit 151 must move by such extended or reduced front face size to obtain the intended first and second states. However, when being fixed to the second frame 102, the display unit 151 may not be moved smoothly to be adapted for the front face of the mobile terminal 100 that is extended or contracted. For this reason, the display unit 151 may be movably coupled to the second frame 102.

More specifically, the display unit 151 may include a first region 151*a* disposed on the front of the mobile terminal 100, a second region 151*b* coupled to a slide frame 103 positioned on the rear of the mobile terminal 100, and a third region 151*c* located between the first region 151*a* and the second region 151*b* and bent around the roller 210. The third region 151*c* may move to the front or the rear according to change in the state of the mobile terminal 100. The slide frame 103 may be formed of a plate-shaped member extending in the longitudinal direction (the third direction) of the mobile terminal 100, and may be coupled to the second rear portion 1022 so as to be movable in the first and second directions D1 and D2.

The first to third regions 151*a*, 151*b*, and 151*c* may be connected to each other, and may form a continuous body of the display unit 151. In addition, as described above, for the movement of the third region 151*c* toward the front face or the rear face of the mobile terminal 100 depending on the moving direction of the second frame 102, the first region 151*a* may be fixed so as not to move to the front face of the mobile terminal 100, and the second region 151*b* may be provided to be movable on the rear face of the mobile terminal. Such configuration of the display unit 151 will be described in more detail below.

The first region 151*a* may be disposed on the front face of the mobile terminal 100, more specifically, the first frame 101, that is, on the front face of the first front portion 1011. The first region 151*a* is fixed to the first frame 101, that is, the front face of the first front portion 1011 so as not to be moved during the movement of the second frame 102, and thus, the first region 151*a* may always be exposed to the front face of the mobile terminal 100.

The third region 151*c* may be adjacent to the first region 151*a* in a direction of a second end 151*e*. The third region 151*c* may extend into the second frame 102 and be rolled on the roller 210. The third region 151*c* may extend out of the second frame 102 and partially cover the second frame 102, that is, the rear front of the second rear portion 1022. Since the second frame 102, i.e., the second rear portion 1022 is adjacent to the first frame 101, i.e., the first rear portion 1012, and the first and second frames 101 and 102 form the rear case of the mobile terminal 100, it may be said that the third region 151*c* is also disposed on the rear front of the first frame 101.

The second region 151*b* may be adjacent to the third region 151*c* and may be disposed on the rear face of the mobile terminal 100, more specifically, on the second frame 102, that is, the rear face of the second rear portion 1022 thereof. The second region 151*b* may be coupled to the slide frame 103 without being directly coupled to the second frame 102.

As a result, the first region 151*a* may be disposed on the front face of the mobile terminal 100 and may be always exposed to the front face regardless of the movement of the second frame 102, and the second region 151*b* may be disposed on the rear face of the mobile terminal 100 and may be always exposed to the rear face regardless of the movement of the second frame 102. In addition, the third region 151*c* may be disposed between the first and second regions 151*a* and 151*b*, and may be selectively placed on the front face or the rear face of the mobile terminal 100 depending on the moving directions D1 and D2 of the second frame 102.

Because of such selective placement of the third region 151*c*, the first rear portion 1012 of the first frame 101 may be exposed to the outside of the mobile terminal 100 because the first rear portion 1012 is covered by the second and third regions 151*b* and 151*c* and the second rear portion 1022 of the display unit 151 in the first state, but, in the second state, the third region 151*c* moves to the front face of the mobile terminal 100 and the second rear portion 1022 also moves in the first direction D1. In addition, the second front portion 1021 of the second frame 102 is hidden by the first front portion 1011 of the first frame 101 in the first state, but, in the second state, moves out of the first frame 101 to support the third region 151c of the display unit 151 disposed on the front face of the mobile terminal 100.

In order to prevent the second front portion 1021 from affecting the internal components during the slide movement, a separating plate 1017 may be further disposed rearward of the second front portion 1021 and fastened with the first front portion 1011. The second front portion 1021 may move between the first front portion 1011 and the separating plate 1017 based on the slide movement of the second frame.

However, the third region 151c may be rolled on the roller 210 and bent in the second frame 102. When converting from the first state to the second state, the third region 151c may extend from the second frame 102 to the front face of the mobile terminal 100 while being rolled on the roller 210 in one direction. On the other hand, when converting from the second state to the first state, the third region 151c may be retracted from the front face of the mobile terminal 100 to the second frame 102 while being rolled on the roller 210 in the opposite direction, and at the same time, may return to the rear face of the mobile terminal 100 from the second frame 102.

A specific location of the foldable mobile terminal in a form of being spread like a book is easily damaged because only the specific location is folded repeatedly. On the other hand, the deformed portion of the flexible display unit 151, that is, a portion rolled on the roller 210, may vary based on the first and second states of the mobile terminal 100, that is, the movement of the second frame 102. Accordingly, the mobile terminal 100 of the present disclosure may significantly reduce deformation and fatigue repeatedly applied to a specific portion of the display unit 151, thereby preventing damage to the display unit 151.

Based on the above-described configuration, overall operations of the mobile terminal 100 will be described as follows. As an example, the state conversion may be performed manually by the user, and an operation of the mobile terminal 100 during such manual state conversion will be described. However, operations of the first to third frames 101 to 103 and the display unit 151, which will be described below, may be performed in the same manner when a power source other than a user's force is used, for example, when the driving unit 200 to be described below is applied.

A rear face cover 1025 may be further disposed on a rear face of the second rear portion 1022 such that the rear face of the display unit positioned on the rear face of the mobile terminal 100 is not exposed to the outside. The rear face of the display unit may be used in the first state when the rear face cover 1025 uses a transparent material, and the rear face of the display unit may be covered such that the movement of the slide frame 103 is not exposed when the rear face cover 1025 uses an opaque material. That is, the second region and the third region of the slide frame 103 and the display unit 151 may move in the first direction and in the second direction in a space between the second rear portion 1022 and the rear face cover 1025.

Figure 7:
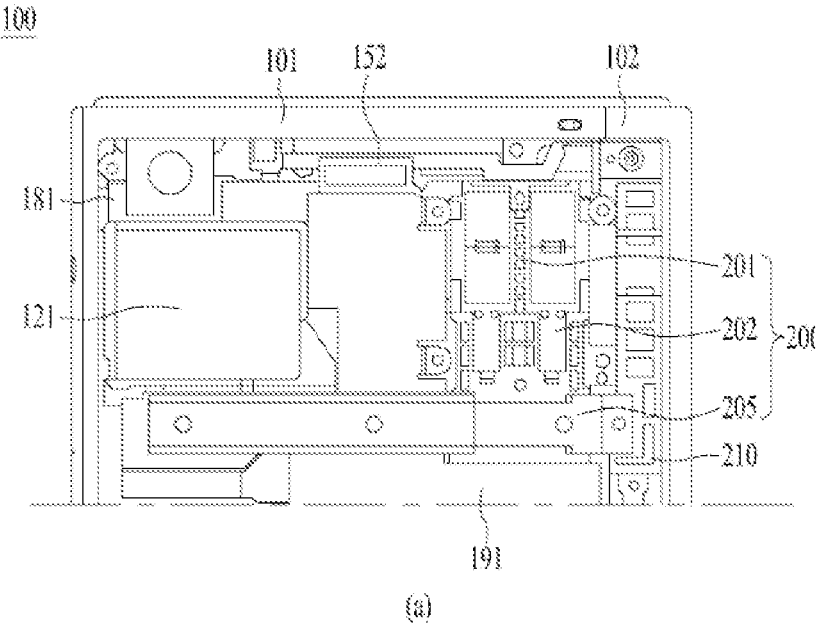
FIG. 7 is a view showing a driving unit of the mobile terminal in accordance with an embodiment.
Figure 7:
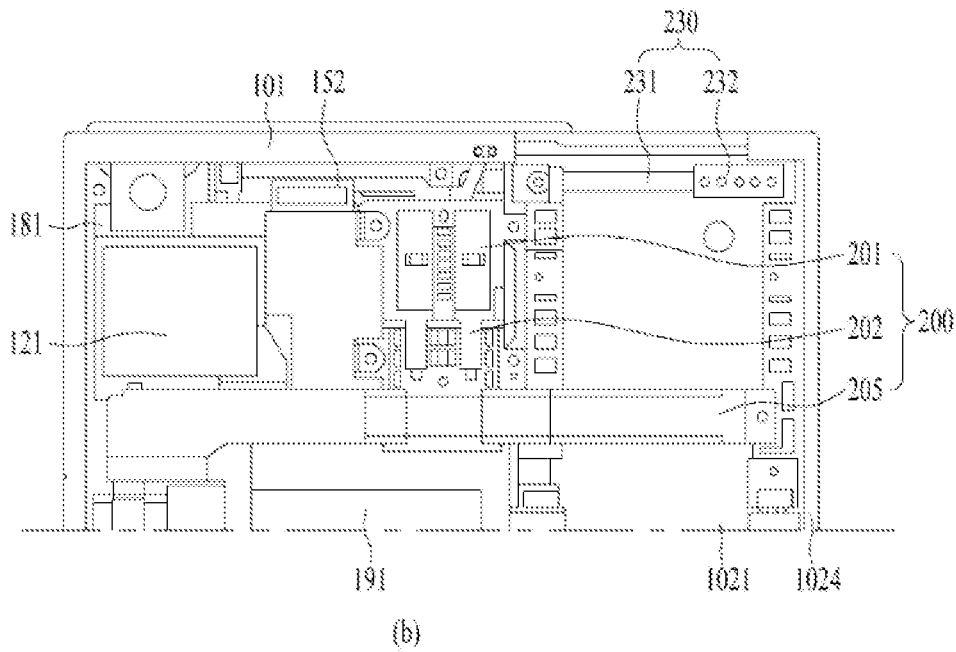

FIG. 7 is a view showing a driving unit 200 of the mobile terminal 100 in accordance with an embodiment. FIG. 7(a) shows the first state and FIG. 7(b) shows the second state. The mobile terminal 100 of the present disclosure may be switched between the states in a manner in which a user manually pulls the second frame 102 in the first direction D1 or pushes the same in the second direction D2 with respect to the first frame 101. However, in the manual method, applying excessive force to the body of the mobile terminal 100 may damage the mobile terminal 100. Accordingly, a driving unit 200 employing a motor 201 may be further provided to cause the second frame 102 to stably move without distortion.

As the motor 201, a motor 201 configured to provide rotational force as shown in FIG. 7, or a linear motor 201 configured to make linear motion may be used. The motor 201 configured to provide the rotational force should have a large diameter to provide large force. Two motors 201 may be used as shown in FIG. 7 to provide driving force of a predetermined magnitude or more in the limited space of the mobile terminal 100 without increasing the thickness.

If the second frame 102 is moved excessively fast, damage or malfunction may occur. Accordingly, a planetary gear configured to decrease the speed of the motor 201 to ensure movement at a stable speed may be further provided. The planetary gear 202 serves to amplify or attenuate the number of revolutions of the motor 201 using a plurality of disc gears having different numbers of teeth. The motor 201 may be fixed to the first frame 101 as shown in FIG. 7(a). The position of the motor 201 is fixed even when the second frame 102 moves in the first direction to switch the mobile terminal 100 to the second state, as shown in FIG. 7(b). Since the second frame 102 linearly moves with respect to the first frame 101 in the first direction or the second direction, rack and pinion gears configured to convert the rotational force of the motor 201 into linear motion may be used. A pinion gear to receive the rotational force of the motor 201 may be arranged to engage with a rack gear 205 composed of teeth continuously arranged in the first direction. The pinion gear may be fixed to the first frame 101 together with the motor 201 and the rack gear 205 may be positioned on the second frame 102. Alternatively, the rack gear 205 may be positioned on the first frame 101, and the motor 201 and the pinion gear may be arranged on the second frame 102. Since the motor 201 holds the pinion gear such that the pinion gear does not rotate, the second frame 102 may maintain the first state and the second state. However, when large external force is applied, the second frame 102 may be displaced as the pinion gear rotates.

A stopper (not shown) configured to fix the positions of the second frame 102 or the rack gear 205 and the first frame 101 may be further provided to fix the mobile terminal 100 in the first state or the second state. When electric current flows through the motor 201 to drive the motor 201, the stopper may be released to allow the movement of the second frame 102. When power is not applied to the motor 201 and thus the motor 201 does not rotate, the first frame 101 and the second frame 102 may be fastened such that the positions thereof are fixed.

When a pair of driving units 200 is symmetrically disposed in the vertical direction (the third direction), stable movement may be made. However, to arrange a battery or the like, the driving unit 200 should be arranged biased to one side in consideration of the limited mounting space of the mobile terminal 100 as shown in FIG. 7(a). According to such asymmetric arrangement of the driving unit 200, the second frame 102 may be distorted during movement due to a difference in movement speed between the upper end portion and the lower end portion. To address this issue, a linear guide 230 may be further provided.

The linear guide 230 may be disposed at both ends of the mobile terminal 100 facing in the third direction, that is, on the upper and lower sides of the mobile terminal 100, in order to supplement the function of one driving unit 200 biased to one side in the third direction. The linear guide 230 may include a guide rail 231 extending in the first direction and a guide block 232 configured to move along the guide rail 231. The guide rail 231 may be disposed on the first frame 101 and the guide block 232 may be disposed on the second frame 102, or vice versa. In this embodiment, the guide rail 231 may be disposed on the second frame 102 to cover the upper and lower sides of the extended portion of the second frame 102 in the second state.

After the guide block 232 is coupled to the first frame 101 and the guide rail 231 is coupled to the second frame 102, the guide block 232 and the guide rail 231 may be slidably fastened to each other. However, for convenience of the fastening, the guide block 232 and the guide rail 231 fastened to each other. Then, the guide block 232 may be first fixed to the first frame 101, and then the second frame 102 may be coupled to the guide rail 231.

The guide block 232 may be provided with a guide groove into which the guide rail 231 is inserted. Alternatively, the guide rail 231 may be provided with a rail groove into which a portion of the guide block 232 is inserted. The fastening portions of the guide rail 231 and the guide block 232 may be formed to be bumpy. Accordingly, movement in the first direction or the second direction may be made without displacement in the thickness direction of the mobile terminal 100. In order to reduce friction between the guide block 232 and the guide rail 231, a self-lubricating member having high wear resistance and low friction resistance, such as a bearing or polyoxymethylene (POM), may be added to the inside of the guide groove.

Figure 8:
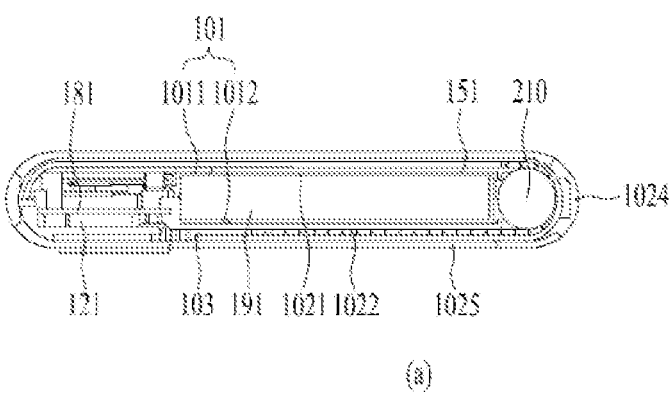
FIG. 8 is a cross-sectional view taken along lines A-A and B-B in FIG. 2.
Figure 8:
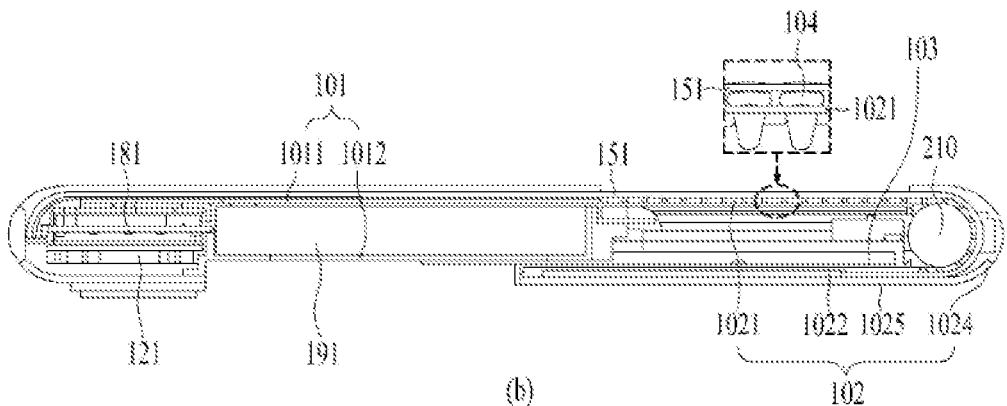

FIG. 8 is a cross-sectional view taken along lines A-A and B-B in FIG. 2. As illustrated in FIG. 2, when the second frame 102 switches to the second state by moving in the first direction, the third region 151c positioned on the rear side moves to the front, and thus a structure to support the rear surface of the third region 151c moved to the front is required. The second front portion 1021 positioned on the front surface of the second frame 102 may be positioned on the rear surface of the third region 151c in the second state. However, in the first state, the second front portion 1021 is disposed to overlap the first front portion 1011 of the first frame 101, and accordingly the first front portion 1011 and the second front portion 1021 form a step. A boundary is formed between the first region 151a and the third region 151c of the flexible display unit 151 by the step formed by the first front portion 1011 and the second front portion 1021. A rolling hinge 104 may be used as a support structure to fill the gap between the second front portion 1021 and the third region 151c of the flexible display unit 151.

The rolling hinge 104 may be positioned on the rear surface of the flexible display unit 151, and have a thickness corresponding to the gap between the second front portion 1021 and the flexible display unit 151 in the second state. As shown in FIG. 8(a), in the first state, the rolling hinge 104 is rolled around the roller 210 and is positioned on the lateral side and rear side of the mobile terminal 100. The flexible display unit 151 and the rolling hinge 104 may be positioned between the second rear portion of the second frame 102 and a rear cover 1025 provided to cover the rear face of the display unit 151. As shown in FIG. 8(b), when switch to the second state occurs, the rolling hinge 104 may move to the front and the rolling hinge 104 may be positioned on the front portion of the second frame 102.

The slide frame 103 may be one component of the rolling hinge 104 located at a distal end of the display unit in that it moves together with the display unit, that is, in that it is coupled to the variable portion. However, because the slide frame 103 does not move toward the front surface of the mobile terminal, the slide frame 103 may have a width greater than that of the rolling hinge 104 in the first direction.

The third region 151c of the display unit 151 in which the rolling hinge 104 is positioned is a portion where bending deformation occurs when switch from the first state to the second state occurs. Accordingly, the rolling hinge 104 may be deformed according to deformation of the third region 151c. Here, the rolling hinge 104 is required to have a predetermined stiffness to maintain the flat state when the flexible display unit 151 is positioned on the front or rear of the mobile terminal. That is, the rolling hinge 104 needs a structure capable of maintaining the flat state in the third direction and performing bending deformation in the first direction.

Figure 9:
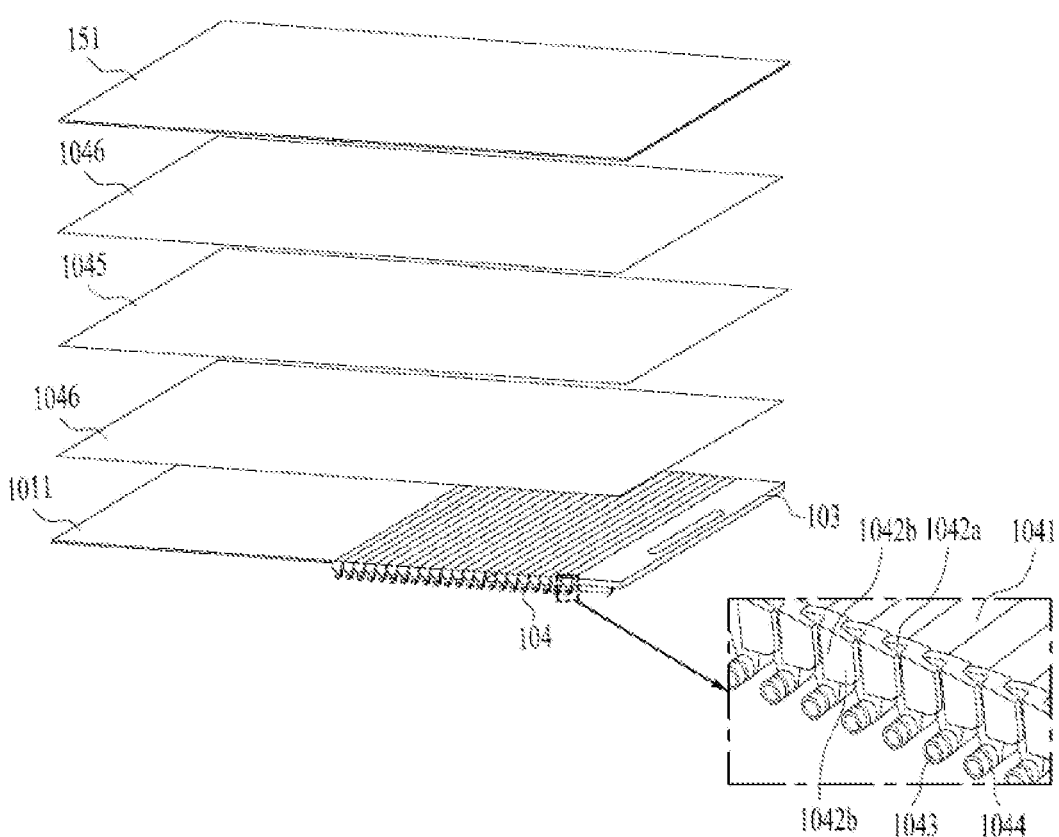
FIG. 9 is a view illustrating a display unit and a rolling plate of the mobile terminal in accordance with an embodiment.

FIG. 9 is a view illustrating a display unit 151 and a rolling hinge 104 of the mobile terminal 100 in accordance with an embodiment. The rolling hinge 104 may include multiple support bars 1041 extending in the third direction. The multiple support bars 1041 may be arranged side by side in the first direction and spaced apart from each other by a predetermined distance. Accordingly, even when the flexible display unit 151 is rolled around the roller 210 and is thus bent, interference between the support bars 1041 may be avoided. The support bars 1041 may be implemented with an injection molding material having a predetermined thickness for stiffness, and may include materials such as SUS or ferrosilicon (FeSi).

The multiple support bars 1041 may be directly attached to the rear surface of the display unit 151. However, this operation may take a long time and produce a lot of defects, resulting in poor productivity. In addition, directly processing the display unit 151 is highly likely to damage the display unit 151. Therefore, a rolling sheet 1045 to fix the multiple support bars 1041 may be further provided. The rolling sheet 1045 may include a metal material, and may employ a superelastic material that is bending-deformable and capable of recovering the flat state after the bending deformation. For example, a superelastic metal sheet such as a thin STS sheet of 0.05 mm or less may be used. An adhesive tape may be attached to both surfaces of the rolling sheet 1045 to bond the rolling sheet 1045 to the support bars 1041 and bond the rear surface of the display unit 151 to the rolling sheet 1045.

The rolling sheet 1045 may be provided with a kerf pattern in which multiple grooves extending in the third direction are formed in the first direction. The grooves in the kerf pattern may be formed between the multiple support bars 1041. The grooves may be formed on a surface of the rolling sheet 1045 to which the support bars 1041 are bonded. The kerf pattern may be formed in a wedge shape that is formed by being gradually narrowed from the surface portion of the rolling sheet 1045.

Instead of the rolling sheet 1045, an elastic material such as silicone may be disposed between the support bars 1041 to join neighboring support bars 1041. In this case, the angle between the support bars 1041 may be varied. The elastic connector may be bent at a position corresponding to the roller 210. When positioned on the front or rear of the mobile terminal, the elastic connector may be unfolded such that the support bars 1041 are disposed forming a flat surface.

The support bars 1041 may form a flat surface corresponding to the rear surface of the display unit 151. Alternatively, as shown in FIG. 8(b), the support bars 1041 may be formed in a shape having a predetermined curvature. The curved support bars 1041 may closely contact the curved surface of the roller 210 when the rolling hinge 104 is rolled around the roller 210. Alternatively, one surface of the support bars 1041 in contact with the display unit 151 maintains a flat state, and the other surface thereof on the opposite side may include a curved surface corresponding to the curvature of the roller 210. In this case, the support bars 1041 may be thick at the ends thereof facing in the first and second directions and have the thinnest portion in the middle thereof.

The rolling hinge 104 may be disposed at a position corresponding to the third region 151c and is rolled and bent around the roller 210. Thus, the rolling hinge 104 may span over the front and rear surfaces. The rolling hinge 104 is connected to the first front portion 1011 of the first frame 101 on the front side and connected to the slide frame 103 on the rear side. In order for the flexible display unit 151 to form a continuous surface without a step, the first front portion 1011 of the first frame 101 positioned on the rear surface of the first region 151a, the slide frame 103 positioned on the rear surface of the second region 151b, and the rolling hinge 104 positioned on the rear surface of the third region 151c may be arranged such that the surfaces thereof in contact with the display unit 151 are at the same height. In particular, since the slide frame 103 moves on the rear of the mobile terminal 100 and moves in the same space as the rolling hinge 104, the rolling hinge 104 may have a thickness corresponding to the thickness of the slide frame 103.

Figure 10:
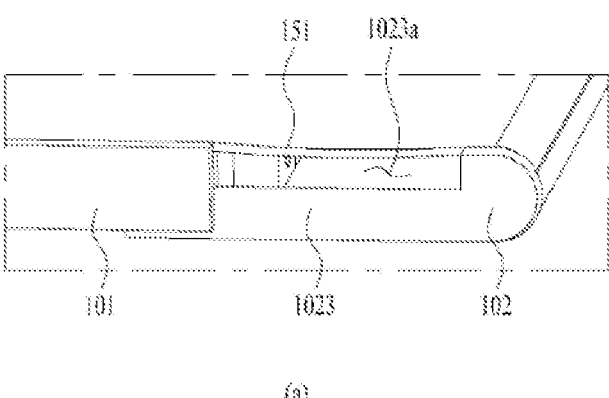
FIG. 10 is a view illustrating an issue raised in an extendable mobile terminal.
Figure 10:
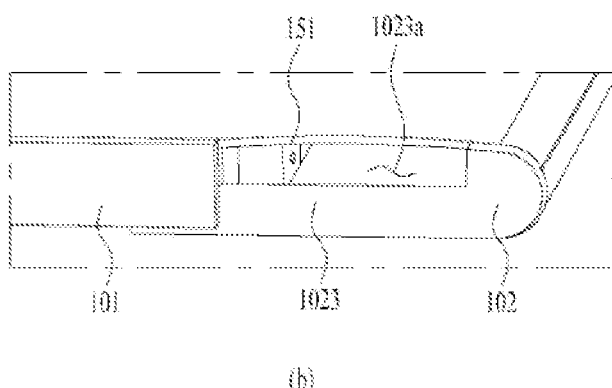

FIG. 10 is a view illustrating an issue raised in an extendable mobile terminal 100. The figure shows the end of the second frame 102 facing in the third direction when the second frame 102 positioned overlapping the first frame 101 is extended as switching from the first state to the second state occurs. Since the display unit 151 contains a flexible material, the display unit 151 may be bent at a position corresponding to the roller 210. However, when the display unit 151 is positioned on the front of the mobile terminal 100 in the second state, it should be maintained in a flat state. Since the rolling hinge 104 is not fixed to the second frame 102, the display unit 151 may sag downward as shown in FIG. 10(a) or rise upward as shown in FIG. 10(b).

The sagging issue of the display unit 151 (in FIG. 10(a)) may be addressed when the support bars 1041 of the rolling hinge 104 described above support the rear surface of the third region 151c of the display unit 151 and the front portion of the second frame 102 supports the support bars 1041. However, in order to address an issue that the display unit 151 moved to the front is not arranged flat but is separated from the second frame 102 as shown in FIG. 10(b), the rolling hinge 104 and the second frame 102 may further include a slide structure 1043, 1027. The slide structures 1043 and 1027 may fasten the rolling hinge 104 (the display unit 151) so as not to be separated from the second frame 102 in the thickness direction of the mobile terminal 100 while allowing the movement thereof only in the first direction or the second direction.

Figure 11:
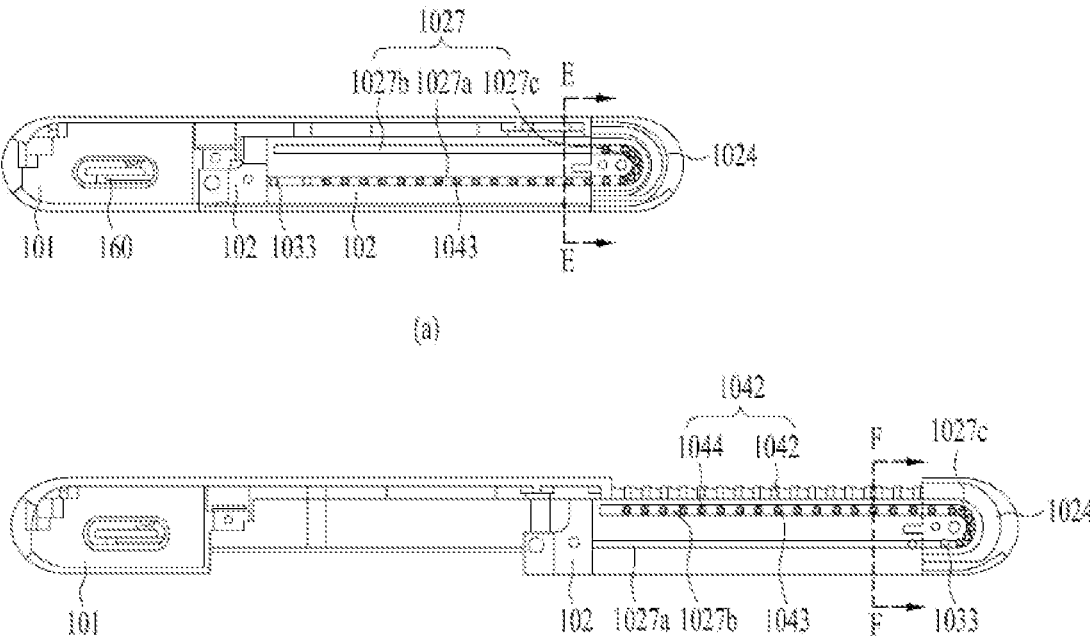
FIG. 11 is a cross-sectional view taken along lines C-C and D-D in FIG. 2.
Figure 12:
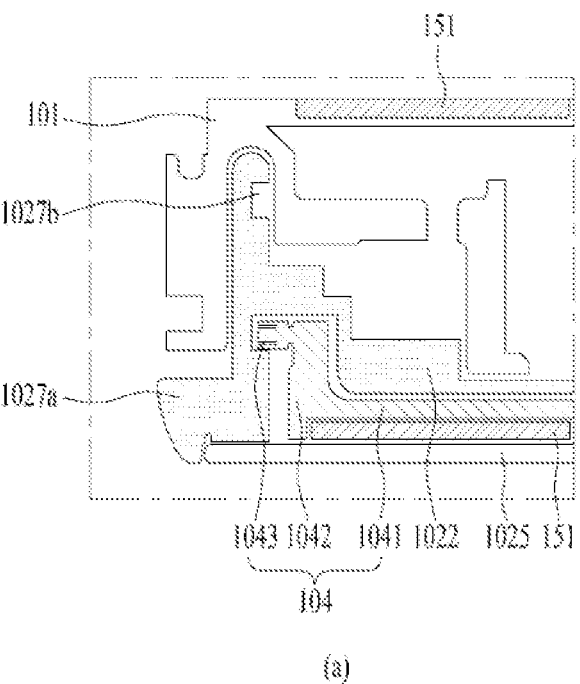
FIG. 12 is a cross-sectional view taken along lines E-E and F-F in FIG. 11.
Figure 12:
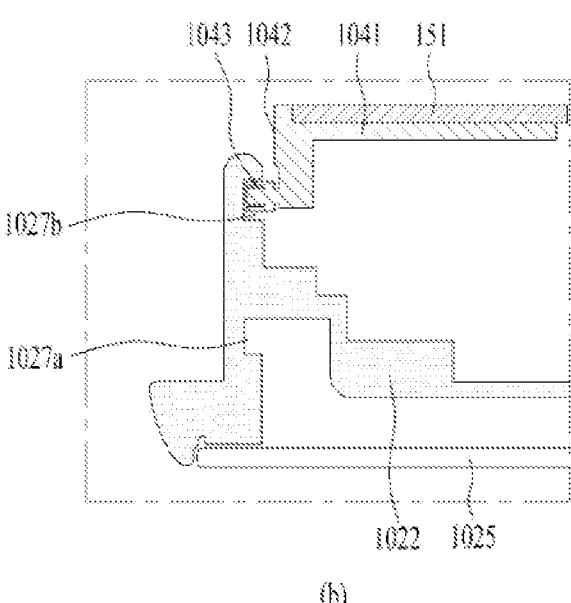
Figure 13:
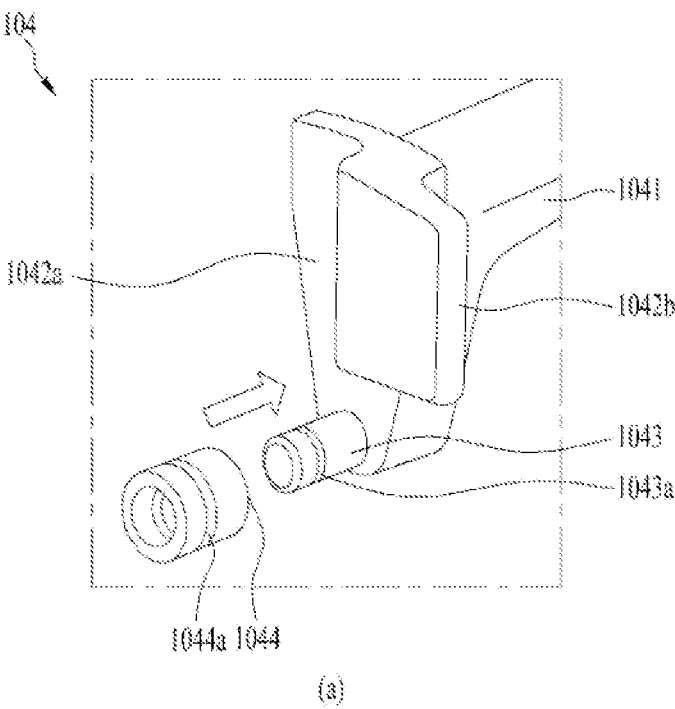
FIG. 13 is a view showing an expanded side portion and a guide hook of the mobile terminal in accordance with an embodiment.
Figure 13:
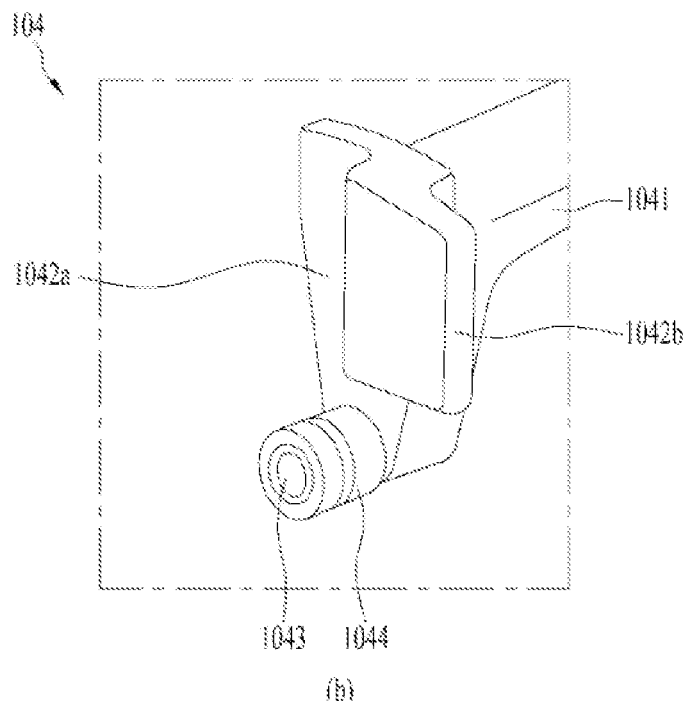

FIGS. 11 to 13 are views showing the slide structures 1043 and 1027 provided on the rolling hinge 104 and the second frame 102. FIG. 11 is a cross-sectional view taken along lines C-C and D-D in FIG. 2, FIG. 12 is a cross-sectional view taken along lines E-E and F-F in FIG. 10, and FIG. 13 is a view showing an expanded side portion 1042 and a guide hook 1043 of the mobile terminal 100 in accordance with an embodiment.

As shown in FIG. 13, the rolling hinge 104 may include a slide hook 1043 protruding toward the second side portion 1023 positioned on the side of the second frame 102 facing in the third direction. As shown in FIG. 11, the second side portion 1023 of the second frame 102 may include a slide rail 1027 into which the slide hook 1043 is movably inserted. FIG. 11 shows the slide rail 1027 formed on the second side portion 1023 of the second frame 102. The slide rail 1027 may include a pair of horizontal portions 1027a and 1027b arranged side by side in a thickness direction and a curved portion 1027c connecting ends of the horizontal portions 1027a and 1027b facing in the first direction. The pair of horizontal portions 1027a and 1027b and the curved portion 1027c may form a U shape, and the slide hook 1043 may move along the slide rail 1027.

In the first state, the slide hook 1043 may be positioned in the horizontal portion 1027a, 1027b positioned on the rear side, as shown in FIG. 11(a). In the second state, the slide hook 1043 may be moved to the horizontal portion 1027a, 1027b positioned on the front side, as shown in FIG. 11(b). When moved from the rear horizontal portion 1027a, 1027b to the front horizontal portion 1027a, 1027b, the slide hook 1043 may pass through the curved portion 1027c. When the slide hooks 1043 pass through the curved portion 1027c, the rolling hinge 104 may be bent and the space between the slide hooks 1043 may be narrowed.

The slide rail 1041 along which the slide hook 1043 moves may guide the movement of the slide hook 1043 and the movement of the slide frame 103 simultaneously. Since the slide frame 103 is also disposed adjacent to the support bars, a slide hook 1033 protruding from the slide frame 103 may be further provided.

FIG. 12(a) shows the second frame 102 in the first state in which the first frame 101 and the second frame 102 overlap each other, and FIG. 12(b) shows the second frame 102 moved from the first frame 101 in the first direction in the second state. As shown in FIG. 12(a), the support bars 1041 and the slide hooks 1043 are positioned on the rear in the first state. In the second state, as shown in FIG. 12(b), the support bars 1041 and the slide hooks 1043 are positioned on the front. The distance from the front face of the display unit 151 to the front horizontal portions 1027a and 1027b may be equal to the distance from the rear face of the display unit 151 to the rear horizontal portions 1027a and 1027b.

When large friction occurs during movement of the slide hooks 1043 along the slide rail 1027, a large load may be applied to the driving unit 200, thereby generating frictional noise or affecting the durability of the product. A self-lubricating member having high abrasion resistance and low friction resistance, such as polyoxymethylene (POM), may be used to facilitate the movement of the slide hooks 1043 on the slide rail 1027. By forming the slide hooks 1043 in a cylindrical shape, the area thereof in contact with the slide rail 1027 may be minimized.

As illustrated in FIG. 13, a slide roller 1044 fitted onto the slide hook 1043 may be further provided. The slide roller 1044 may be fitted onto the cylindrical slide hook 1043 to rotate about an axis extending in a direction in which the slide hook 1043 protrudes. The slide roller 1044 may rotate when the slide hook 1043 moves along the slide rail 1027, thereby reducing friction generated between the slide roller 1044 and the slide rail 1027.

A bearing structure may help to reduce the friction, but it may increase the overall size. For this reason, a simple ring-shaped slide roller 1044 may be used. A fastening groove 1043a and a fastening protrusion 1044a may be further provided to prevent the slide roller 1044 from being separated from the slide hook 1043. When the fastening protrusion 1044a is inserted into the fastening groove 1043a, the fastening groove 1043a formed on the outer circumferential surface of the slide hook 1043 in a ring shape and the ring-shaped fastening protrusion 1044*a* protruding from the inner surface of the slide roller 1044 are fastened to each other.

The second side portion 1023 of the second frame 102 is disposed overlapping the first side portion 1013 of the first frame 101 in the first state, and is exposed to the outside in the second state. Since the second side portion 1023 is positioned inside the first side portion 1013 of the first frame 101 in the first state, it may be difficult to connect the interface unit 160, the user input unit 123, the audio output unit 152, the antenna, and the like, which are positioned on the first side portion 1013, to the printed circuit board 181, which is positioned inside.

The second side portion 1023 may include an opening 1023*a* formed by omitting at least a part of the second side portion 1023 to connect the components positioned on the first side portion 1013 to the printed circuit board 181 positioned inside the first frame 101. Through the opening 1023*a*, a connector may be arranged between the components positioned on the first side portion 1013 and the printed circuit board. The opening 1023*a* may have a shape elongated in the first direction to prevent interference between the connector and the second side portion 1023 of the second frame 102 even when the second frame 102 is moved.

However, in order to prevent the inside of the mobile terminal 100 from being exposed through the opening 1023*a* in the second state, an expanded side portion 1042 may be formed at an end of the support bar 1041 to cover the opening 1023*a* in the second state. The expanded side portion 1042 may have a larger area than the cross section of the support bar 1041 at the end of the support bar 1041. The slide hook 1043 may be formed on a first expanded side portion 1042*a* extending in a direction away from the display unit 151. When the slide hook 1043 is disposed parallel to the support bar 1041, the second side portion 1023 of the second frame 102 should be extended adjacent to the display unit 151, which may make it difficult to form the opening 1023*a*. Accordingly, the slide hooks 1043 may be formed at positions spaced apart from the display unit 151 by a predetermined distance. The first expanded side portion 1042*a* may be formed in a fan shape to have a width that is reduced as the first expanded side portion 1042*a* extends in a direction away from the display unit 151. FIG. 13 is a view showing an embodiment of the rolling hinge 104 of the mobile terminal 100. Since the rolling plates at positions on the curved portion 1027*c* of the slide rail 1027 spaced apart from the display portion 151 are disposed adjacent to each other, the first expanded side portion 1042*a* may be formed in a fan shape to prevent the rolling plates from overlapping each other.

When the rolling hinge 104 is positioned in the curved portion 1027*c* of the slide rail 1027, since neighboring expanded side portions 1042 are close to each other in a portion spaced apart from the display unit 151, i.e., at a position in which the slide hook 1043 is disposed. The expanded side portion 1042 may have the shape of a fan where its width decreases as the expanded side portion 1042 is farther away from the support bar 1041 to prevent an overlap between first expanded portions 1042*a*.

The expanded side portion 1042 may also extend in the left-right direction, and may thus cover a space between neighboring support bars 1041. The expanded side portion 1042 may further include a second expanded side portion 1042*b* forming a step with respect to the first expanded side portion 1042*a* as shown in FIG. 13. The second extension side portion 1042*b* may be disposed to overlap the first expanded side portion 1042*a* adjacent thereto to cover the space between the support bars 1041. The second expanded side portion 1042*b* may have a size corresponding to the thickness-wise size of the opening 1023*a* formed in the second side portion 1023 of the second frame 102. The second expanded side portion 1042*b* may be formed to be shorter than the first expanded side portion 1042*a* on the side spaced apart from the display unit 151.

The second expanded side portion 1042*b* may be formed to be shorter than the first expanded side portion 1042*a* to prevent the second expanded side portions 1042*b* from overlapping each other when the rolling plates pass through the curved portion 1027*c* of the slide rail 1027. The second expanded side portion 1042*b* may be formed to have a size corresponding to the size of the opening 1023*a* to cover the space between the first expanded side portions 1042*a* to prevent the inside of the second frame 102 from being exposed to the outside.

Figure 14:
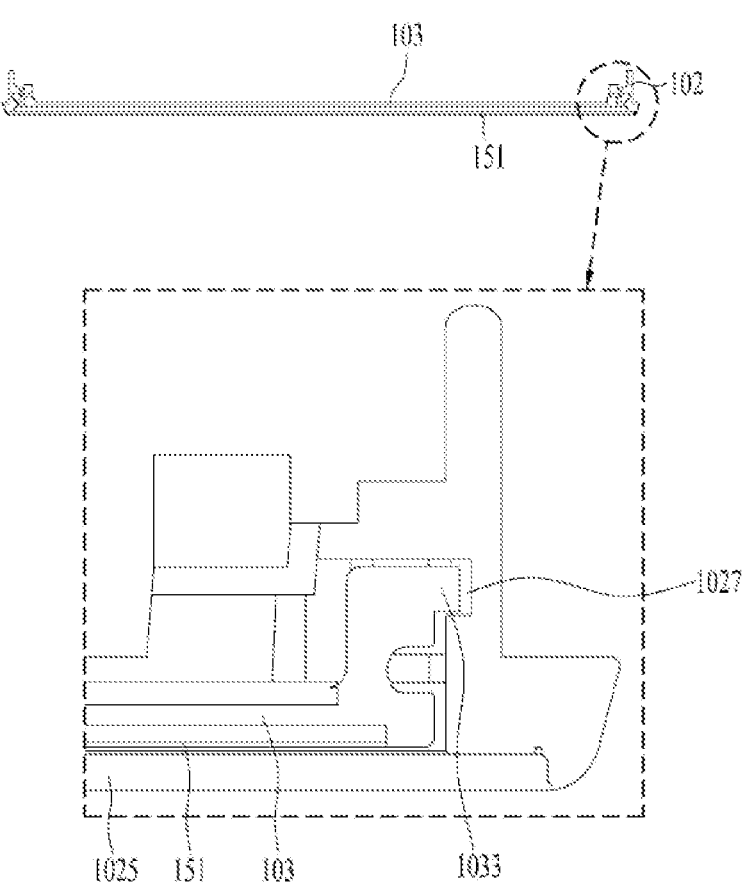
FIG. 14 is a view showing a slide frame and a second frame of the mobile terminal.

FIG. 14 is a view showing the slide frame 103 and the second frame 102 of the mobile terminal 100. Like the rolling hinge 104, the slide frame 103 is positioned on the rear surface of the display unit 151 and moves together with the display unit 151. The rolling hinge 104 moves to the back and front of the mobile terminal 100, but the slide frame 103 moves only on the back of the mobile terminal 100, that is, on the second rear portion 1022 of the second frame 102. A structure to guide the slide frame 103 to linearly move in the first direction or the second direction without distortion is needed. A guide slot extending in the first direction may be formed in the rear surface of the second frame 102 and the slide frame 103 may be configured to move along the guide slot.

Figure 15:
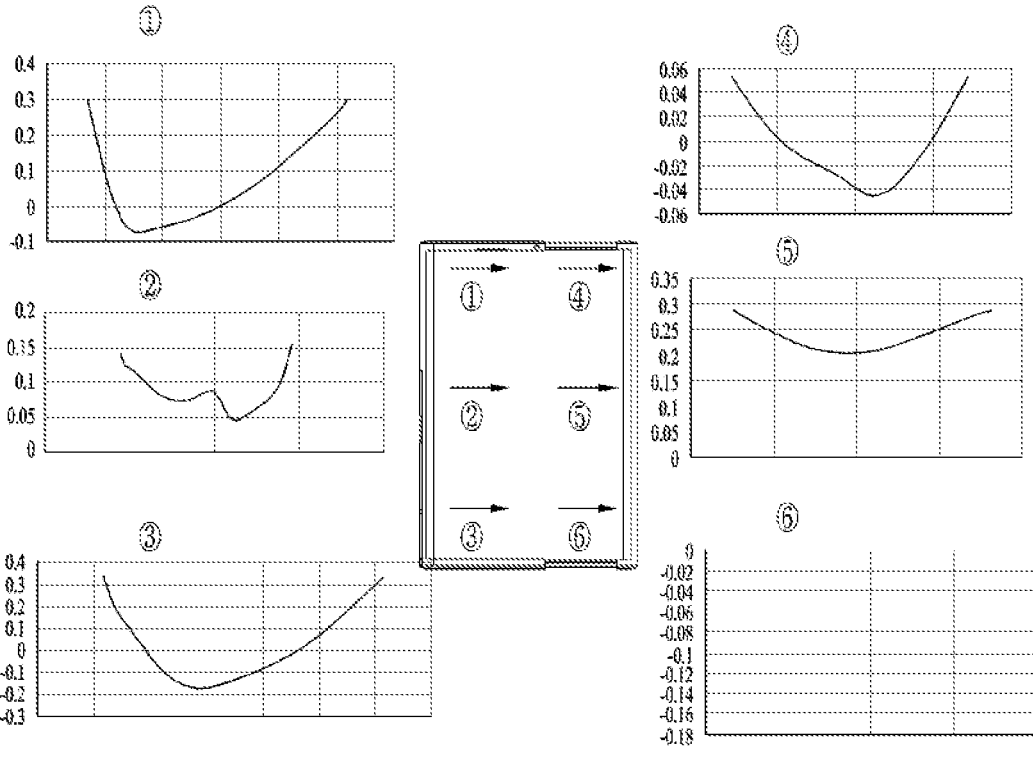
FIG. 15 is a graph showing phase distortion in the mobile terminal.

However, since the second side portion 1023 of the second frame 102 includes the slide rail 1027 extending in the first direction as described above, the movement of the slide frame 103 may be guided through the slide rail 1027, into which the slide hook 1043 of the rolling hinge 104 is inserted, without forming a separate guide rail. As shown in FIG. 15, slide hooks 1033 may be formed at both ends of the slide frame 103 to guide the slide frame 103 to move along the slide rail 1027. The slide hooks 1033 of the slide frame 103 may have a shape similar to that of the slide hook 1043 of the rolling hinge 104. The slide hooks 1033 protrude from the display unit 151 in a direction away from the display unit 151. However, since the slide hooks 1033 of the slide frame 103 do not move to the front, they move only on a first horizontal portion.

Since the slide frame 103 and the rolling hinge 104 move along the slide rail 1027, movement in the first direction and movement in the second direction may be guided stably, and the issue of separation of the display unit 151 from the second frame 102 may be addressed. However, since the slide rail 1027 is positioned at the end facing in the third direction, the middle portion of the slide frame 103 in the third direction may be separated from the second frame 102. To prevent the separation at the middle portion of the slide frame 103 while both ends of the slide frame 103 are fixed to the frame 102, a magnetic material may be used.

Figure 16:
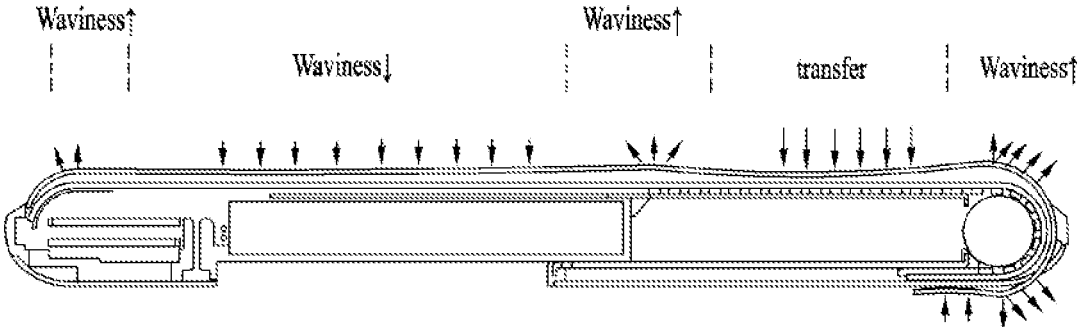
FIG. 16 is a conceptual view for explaining causes of the phase distortion of FIG. 15.

FIG. 15 is a graph showing phase distortion in the mobile terminal 100, and FIG. 16 is a conceptual view for explaining causes of the phase distortion of FIG. 15.

The flexible display unit 151 may include a portion (fixed portion) attached to the first frame 101 and a portion (variable portion) not attached to the first frame 101 or a bending portion. The first region 151*a* is fixed to the first frame 101, but the second region 151*b* is not fixed to the first frame 101 so that it is capable of bending or moving to the front and rear side.

In FIG. 15, ①, ②, and ③ respectively show phase distortion in the display unit 151 at the top, middle, and bottom of the fixed portion, and ④, ⑤, and ⑥ respectively show phase distortion in the display unit 151 at the top, center, and bottom of the variable portion. Since the fixed portion is fixed to the first frame 101, the amount of phase distortion is relatively low. In particular, since the center part is more stably attached to the first frame 101 than the top and bottom parts, the amount of phase distortion at the center part is lower than the top and bottom parts.

However, since an end in the second direction, i.e., the left end in the drawing is attached to the first frame 101 while being bent as shown in FIG. 16, it may have a repulsive force to the flatness of the display unit 151. As a result, phase distortion may occur at the end in the second direction. In addition, the end of the fixed portion facing in the first direction is adjacent to the variable portion, phase distortion may occur thereat due to the deformation of the variable portion.

The rear surface of the variable portion is supported by the rolling hinge 104. However, since the rolling hinge 104 has a deformable structure unlike the frames, the phase distortion at the fixed portion may increase. The phase distortion may increase at a point between the fixed and variable portions where the support structure (e.g., frame or rolling hinge) is partially omitted on the rear surface thereof. Further, the phase distortion may also increase at a point where the variable portion is rolled on the roller 210.

Referring to FIG. 16, the phase distortion at the end of the fixed portion facing in the second direction, the point between the fixed and variable portions, and the point where the variable portion is rolled on the roller 210 may be convex outward, whereas the phase distortion at the center of the fixed portion attached to the first frame 101 may be reverse to the former distortion.

The phase distortion at the center of the variable portion is similar to that of the fixed portion. A line distinguishing between the support bar 1041 and a portion combined with the support bar 1041 of the rolling hinge 104 on the rear surface may appear on the display unit 151.

To minimize the phase distortion, the display unit 151 needs to be in a tight state. To reduce vertical distortion in the display unit 151, the variable portion of the display unit 151 should be flat.

Since the end of the third region (variable portion) facing in the vertical direction (third direction) is fixed by the liner guide 230, there may be no waviness. However, since there may be waviness in the center thereof facing in the third direction, a rivet rail 1029 or slide rivets 1049 and 1039 may be used to prevent from the second area 151*b* or the third area 151*c* from separated from the second frame 102.

Figure 17:
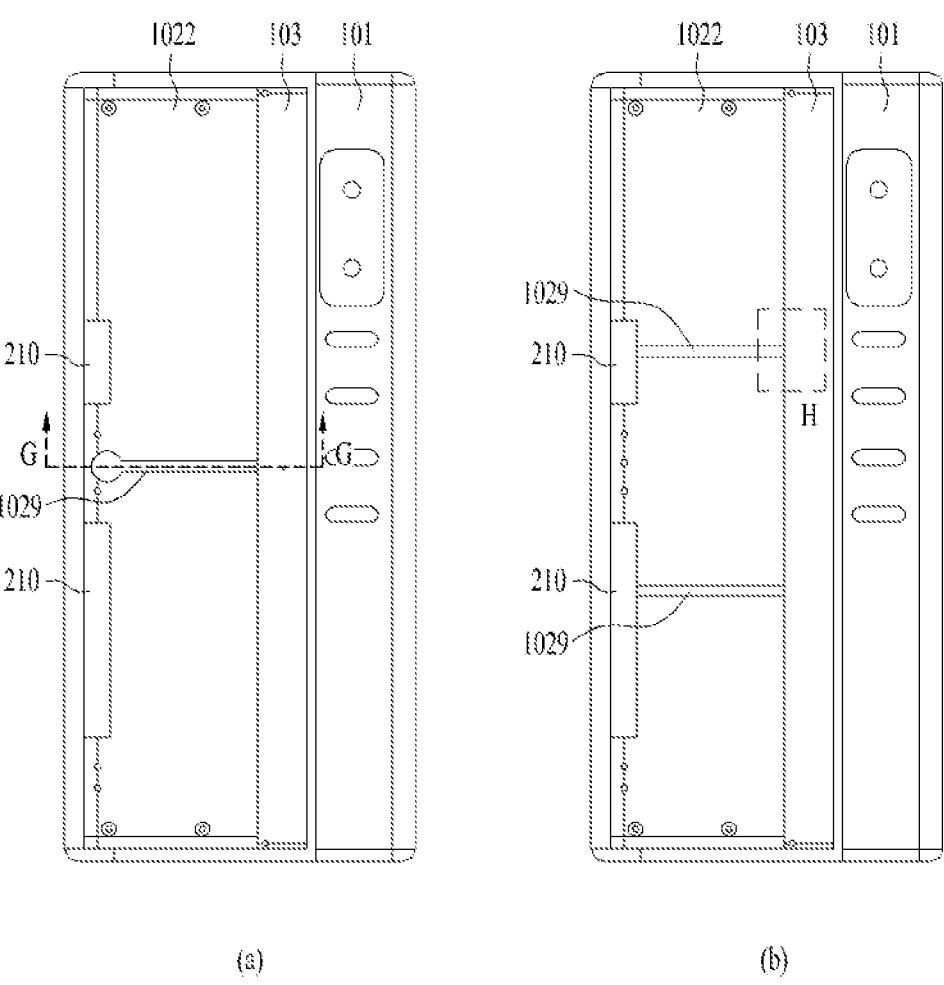
FIG. 17 is a view showing a rear surface of a second frame on which a guide rail of a mobile terminal is formed.
Figure 18:
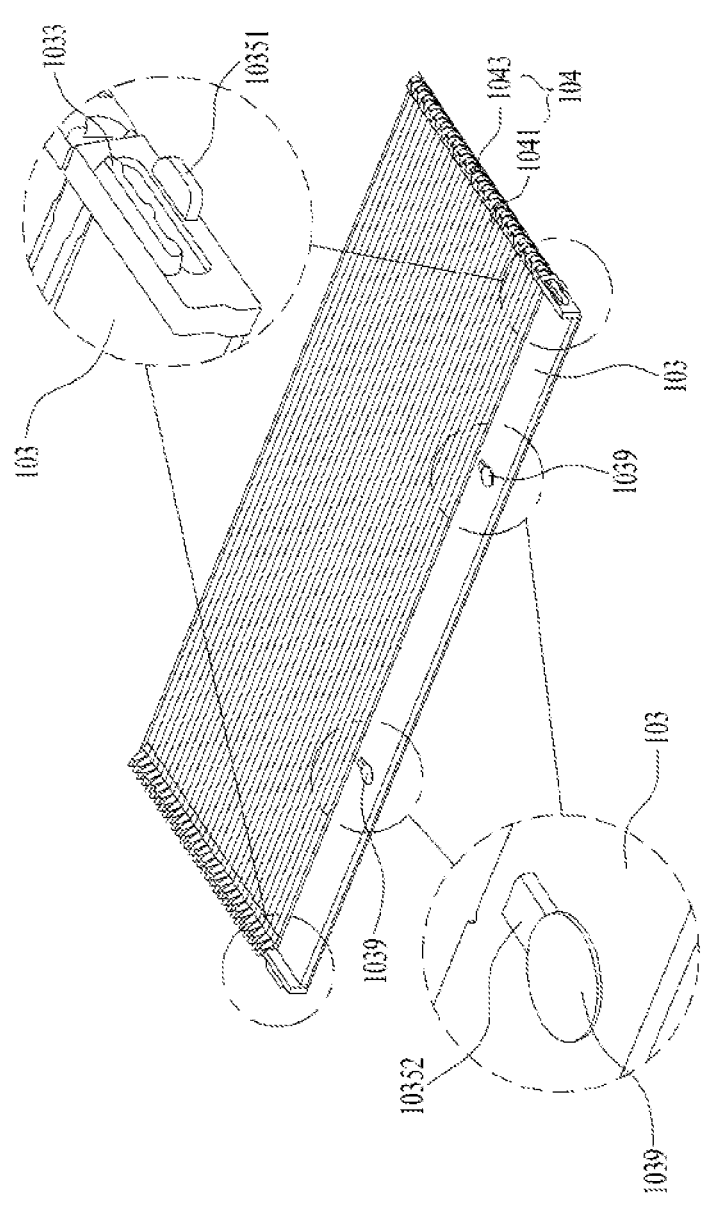
FIG. 18 is a view showing a rolling hinge and a slide frame of a mobile terminal.

FIG. 17 is a view showing a rear surface of the mobile terminal 100 where the display unit 151 is omitted, and the rivet rail 1029 is not covered so as to be exposed in the view. FIG. 18 is a view showing the slide frame 103 and the rolling hinge 104 according to the present disclosure, and a guide rivet 1039 and the slide hook 1033 of the slide frame are shown.

The rivet rail 1029 refers to a hole defined in the second rear portion 1022 of the second frame 102 and extending in the first direction. A length of the rivet rail 1029 may be equal to or greater than a distance that the slide frame 103 moves with respect to the second frame 102. The rivet rail 1029 may include one rivet rail 1029 at a center in the vertical direction as shown in (a) in FIG. 17 or at least two rivet rails 1029 symmetrical with each other in the third direction.

The guide rivet 1039 formed on the slide frame to slide by being fastened to the rivet rail 1029 may be further included. The guide rivet 1039, as a protrusion formed at a position corresponding to the rivet rail 1029, may protrude from a front surface of the slide frame 103.

Figure 19:
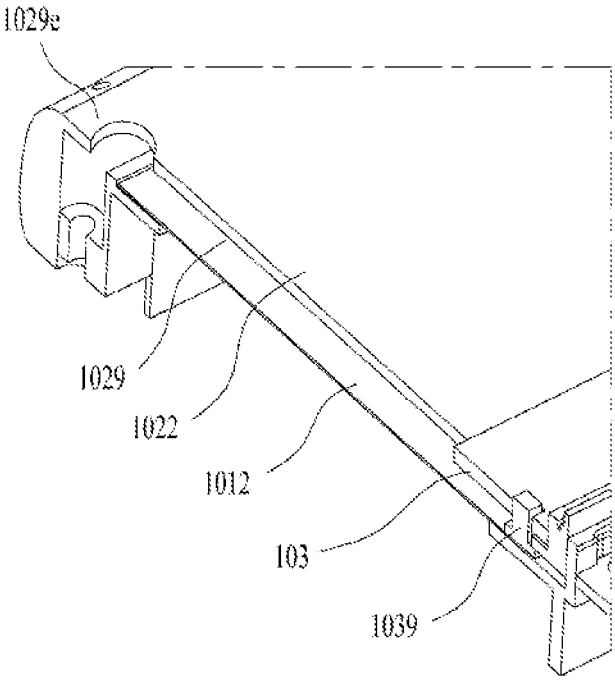
FIG. 19 is a G-G sectional view of FIG. 17.

FIG. 19 is a cross-sectional view taken along a line G-G in FIG. 17, showing the guide rivet 1039 inserted into the rivet rail 1029. The guide rivet 1039 may protrude from the front surface of the slide frame 103 and may move in the first direction while being inserted into the rivet rail 1029 when the mobile terminal 100 is switching from the first state to the second state. To prevent the guide rivet 1039 from being separated from the rivet rail 1029, a head 1039*b* having a diameter greater than a diameter of a body 1039*a* of the guide rivet 1039 may be included at an end of the guide rivet 1039.

Figure 20:
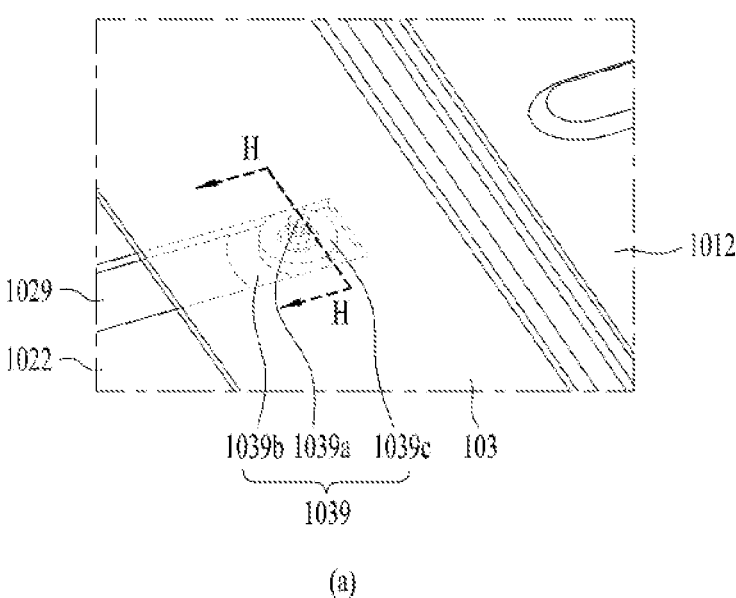
FIG. 20 is an enlarged view of a portion H in FIG. 17.
Figure 20:
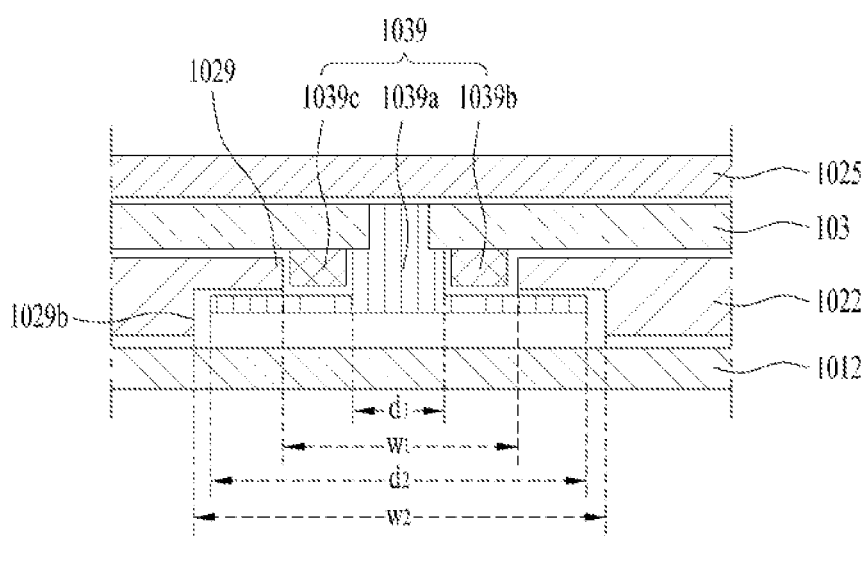

FIG. 20 is an enlarged view of a portion H in FIG. 17, showing the guide rivet 1039 of the mobile terminal 100. (a) in FIG. 20 is a view showing the slide frame 103 in a translucent state such that the guide rivet 1039 formed on the slide frame 103 is visible. (b) in FIG. 20 is a cross-sectional view taken along a line H-H in (a) in FIG. 20, and a lower side in the drawing is a front side of the mobile terminal 100 and an upper side in the drawing is a rear side of the mobile terminal 100.

A diameter d1 of the body 1039*a* located on the rivet rail 1029 is smaller than a width w1 of the rivet rail 1029, and a diameter d2 of the head 1039*b* is greater than the width w1 of the rivet rail 1029 (d1<w1<d2). Because the diameter of the head 1039*b* of the guide rivet 1039 is greater than the width w1 of the rivet rail 1029, the guide rivet 1039 may remain fastened to the rivet rail 1029 and the slide frame 103 may slide on a rear surface of the second frame 102.

The rivet rail 1029 may further include an extended groove 1029*b* defined in the front surface of the rear portion 1022 of the second frame 102 such that the head 1039*b* of the guide rivet 1039 does not protrude forwardly of the second rear portion 1022 of the second frame 102 ((b) in FIG. 18).

The extended groove 1029*b* refers to a stepped portion extending in a width direction of the rivet rail 1029. The head 1039*b* may be inserted into the extended groove 1029*b*. The extended groove 1029*b* may have a size corresponding to the diameter of the head 1039*b* and may have a diameter slightly greater than the diameter of the head 1039*b* in consideration of tolerance (d2≤w2). The extended groove 1029*b* may be defined to be thicker than the head 1039*b* such that the head 1039*b* does not protrude from the front surface of the second rear portion 1022 of the second frame 102.

The guide rivet 1039 may further include a ring-shaped washer 1039*c* positioned around the body 1039*a*. The washer 1039*c* may prevent the guide rivet 1039 or the rivet rail 1029 from being worn when the guide rivet 1039 moves along the rivet rail 1029. As shown in (b) in FIG. 20, the washer 1039*c* may be inserted into the rivet rail 1029 to act as a buffer such that the body 1039*a* of the guide rivet 1039 does not directly come into contact with the rivet rail 1029. A material that is resistant to friction, such as POM (Poly Oxy Methylen) may be used for the washer 1039*c*.

The guide rivet 1039 and the rivet rail 1029 may deploy the display unit 151 without distortion and reduce a lifting phenomenon of a central portion of the display unit 151, but a problem that a flatness of the variable portion is low compared to that of the fixed portion in the second state of the mobile terminal 100 still remains. To solve the above problem, a method of pulling the end of the display unit 151, that is, the slide frame 103 in the second direction may be used. When the slide frame 103 is pulled in the second direction, the variable portion located at the front may receive a force in the first direction and maintain the flat state.

However, when the driving unit is additionally disposed to apply the force to the slide frame 103 or an elastic member or the like that provides a pulling force is used, there is a problem in that additional space must be secured to mount the corresponding component in the mobile terminal.

Accordingly, in the present disclosure, a stopper 1035 that limits the movement of the slide frame 103 in the first direction may be disposed to more simply solve the lifting problem of the display unit. The display unit 151 may maintain the flat state while minimizing additional component using the stopper 1035. The stopper 1035 may include fixed stoppers 10353 and 10354 located on the second frame 102 and slide stoppers 10351 and 10353 located on the slide frame 103, and the movement of the slide frame 103 in the first direction may be restricted when the fixed stoppers 10353 and 10354 come into contact with the slide stoppers 10351 and 10353.

As the second frame 102 extends in the first direction, the display unit 151 located on the rear side receives a force in the first direction. The stopper 1035 may provide the force in the second direction to the slide frame 103 using the force that the display unit 151 pulls the slide frame 103 in the first direction. Because of the action-reaction principle, the force in the second direction may be obtained by restricting the movement in the first direction.

To obtain the force of pulling the slide frame 103 in the second direction, the stopper 1035 may be disposed such that the slide frame 103 is slightly biased in the second direction from a design position in the second state. For example, when a movement distance of the slide frame 103 is 36.75 mm, the slide frame 103 may be constructed such that the fixed stoppers 10353 and 10354 and the slide stoppers 10351 and 10353 come into contact with each other when the slide frame 103 moves by 36.70 mm.

Such difference (0.05 mm) is referred to as an amount of overlap, and the greater the amount of overlap, the greater the magnitude of the pulling force. When the amount of overlap is great, the magnitude of the force of pulling in a flat manner increases, but there may be a risk of damage to the display unit 151 because stress is applied thereto and the extension driving of the mobile terminal may be affected, so that the amount of overlap may be designed considering an amount of lift.

Figure 21:
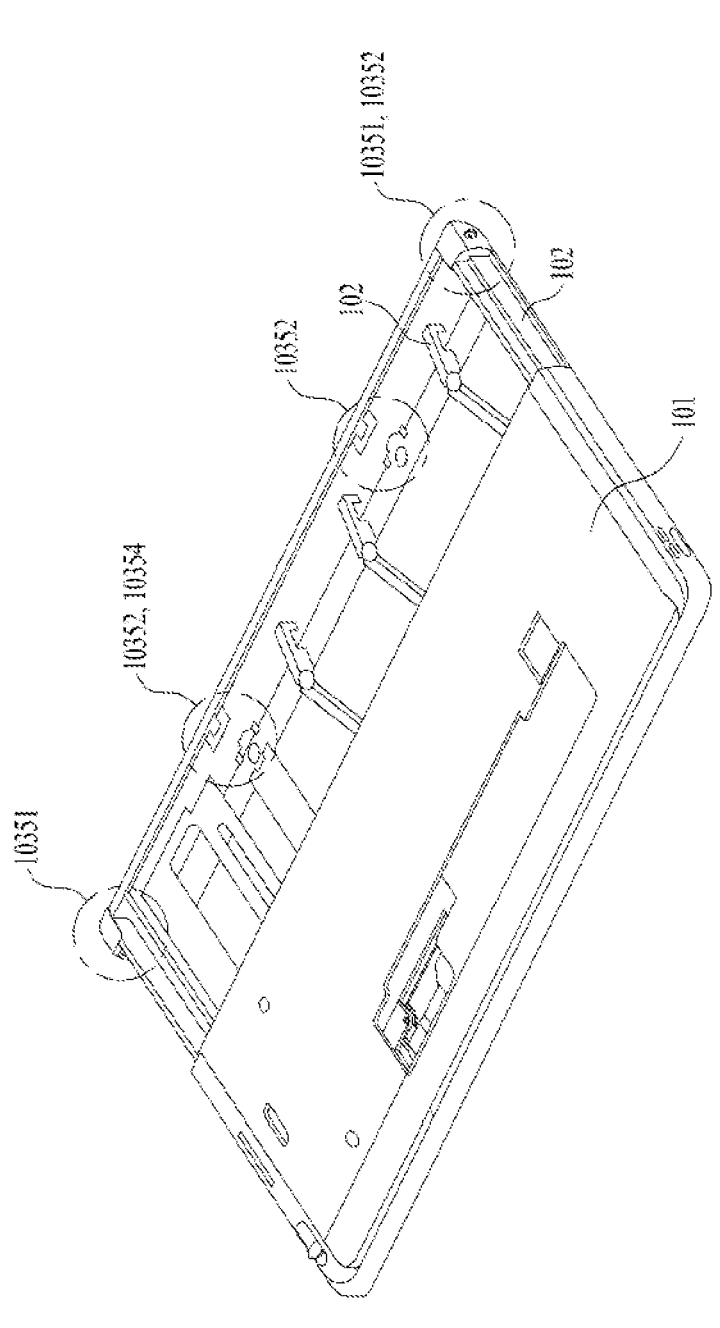
FIG. 21 is a view showing a first frame and a second frame in a second state of a mobile terminal.
Figure 22:
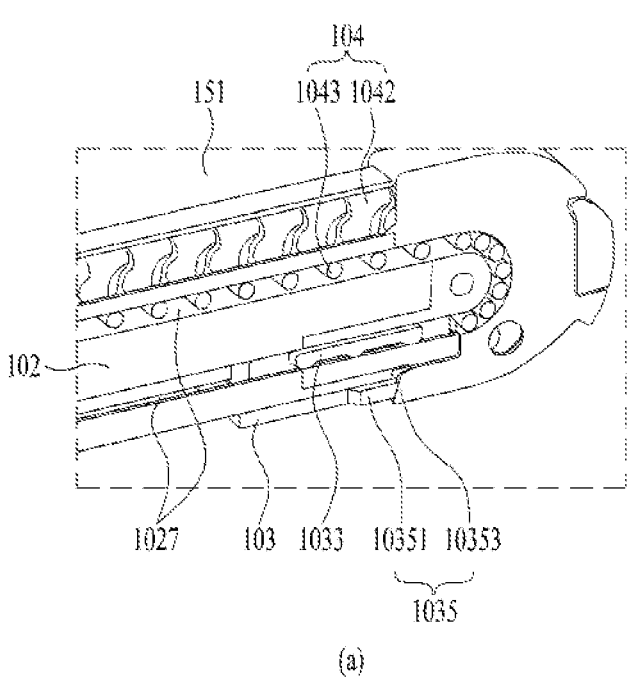
FIG. 22 is a view showing a first stopper.
Figure 22:
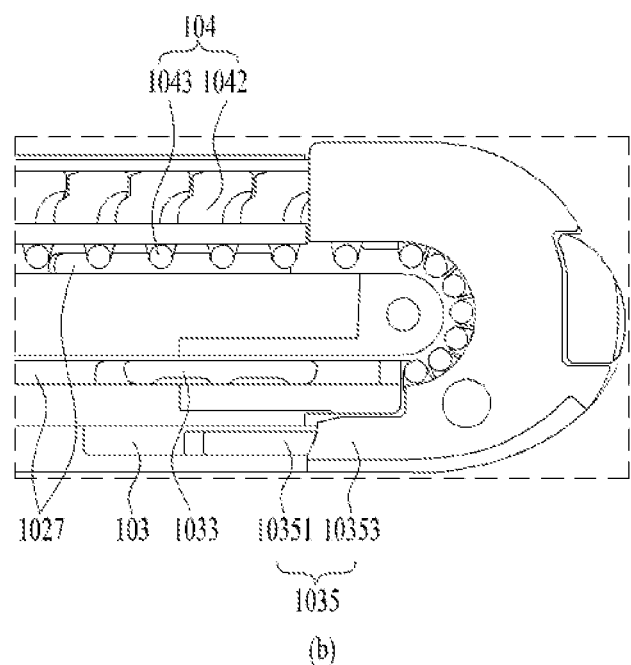
Figure 23:
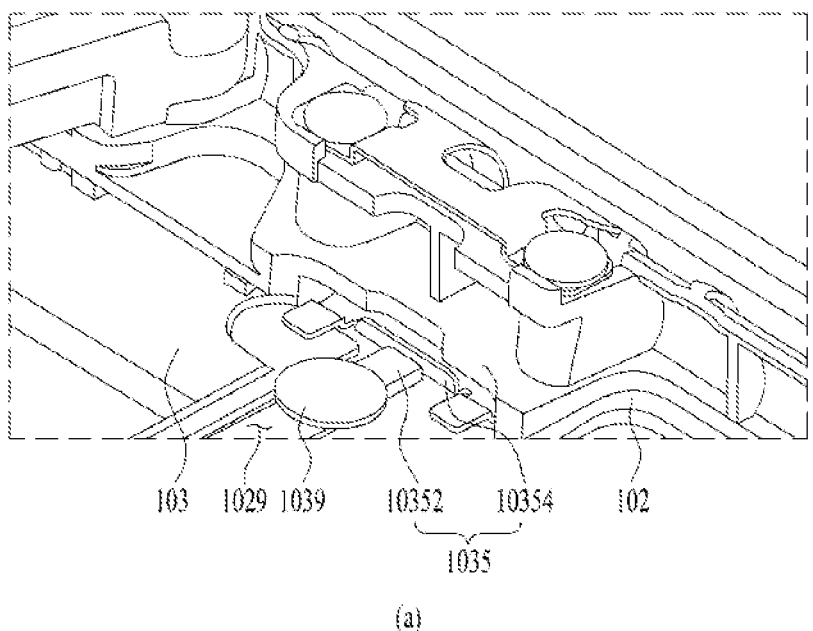
FIG. 23 is a view showing a second stopper.
Figure 23:
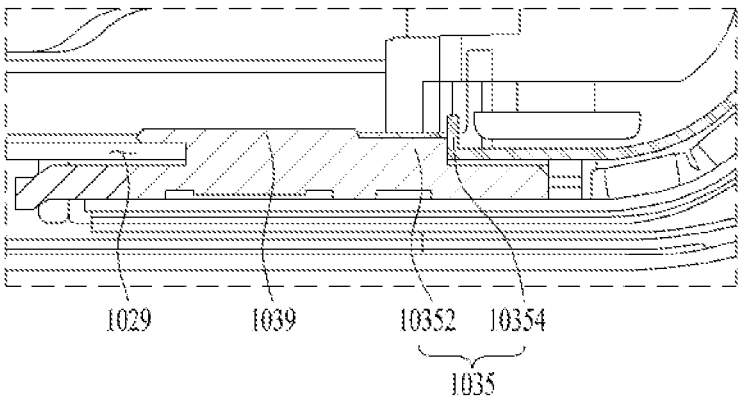

More specifically, the configuration of the stopper 1035 of the present disclosure will be illustrated via FIGS. 21 to 23. FIG. 21 is a view showing the first frame and the second frame 102 in the second state of the mobile terminal. FIG. 22 is a view showing the first stoppers 10351 and 10353, and FIG. 23 is a view showing the second stoppers 10352 and 10354.

When the stopper 1035 is located on one side, the force pulling the slide frame 103 in the second direction is applied asymmetrically, which may cause the distortion of the slide frame 103. Therefore, the stoppers may be arranged at regular spacings in the third direction, and the above-described structure for guiding the slide movement of the slide frame 103 may be utilized.

The first stoppers 10351 and 10353 located at ends of the slide frame 103 in the third and fourth directions, and the second stoppers 10352 and 10354 located between the pair of first stoppers 10351 and 10353 may be included. The first stoppers 10351 and 10353 may be located at the ends of the slide frame 103 in the third and fourth directions where the slide hooks 1033 are located, and the second stoppers 10352 and 10354 may be located on the guide rivet 1039 and the rivet rail 1029.

First, with reference to FIG. 22, the first stoppers 10351 and 10353 will be described. The first stoppers 10351 and 10353 include the first slide stopper 10351 located at the end of the slide frame 103 in the third direction, and the first slide stopper 10351 comes into contact with the first fixed stopper 10353 located on the second frame 102 when reaching the second state.

Because the second side portion of the second frame 102 is located at the end of the slide frame 103 in the third direction, the second side portion may include a stopper rail extending in the first direction and along which the first slide stopper 10351 moves. Because the slide rail 1027 on which the slide hook 1033 moves has a U-shape extending forward for the slide hook 1033 of the rolling hinge 104 to move, it is difficult to build the first fixed stopper 10353 on the slide rail 1027. Therefore, the stopper rail may be formed separately from the slide rail 1027 and disposed side by side with the straight rail located on the rear side of the slide rail 1027.

When the first slide stopper 10351 is disposed adjacent to a position of the slide frame 103 where the display unit 151 is coupled, the first slide stopper 10351 may move along a rear end of the second side portion. In this case, the stopper rail may have a form in which one side is open.

The first fixing stopper 10353 may be located at the end of the second frame 102 in the third direction and may be an end of the stopper rail. The second fixing stopper 10354 may be formed on the second side portion, and may be constructed using the side frame coupled to the second frame 102 as shown in FIG. 22.

The side frame is a part that covers a bending area of the display unit 151. Because a fastening member is located at the end of the side frame in the third direction to be fastened to the second frame 102, the first fixed stopper 10353 may be implemented using an end of the fastening member.

FIG. 23 shows the second stoppers 10352 and 10354 located at a central portion in the third direction. The aforementioned rivet rail 1029 and guide rivet 1039 may be used. As described above, because the slide stopper slides in the first direction like the slide frame 103, a space in which the slide stopper moves is required. The guide rivet 1039 and the second slide stopper 10352 may move in the first direction using the rivet rail 1029 without forming a separate rail on the second frame 102.

The second slide stopper 10352 may be biased in the first direction from the guide rivet 1039 and may have a shape of protruding from the guide rivet 1039. The second slide stopper 10352 may be located only on the body of the guide rivet 1039, but may be extended to the head to receive greater force.

The second fixed stopper 10354 that comes into contact with the second slide stopper 10352 in the second state may use an end of the rivet rail 1029 in the first direction. An area size of the second fixed stopper 10354 may be expanded at the end of the rivet rail 1029 such that a sufficient force is received from the second fixed stopper 10354 and the force in the second direction is applied to the slide rail 1027. When the second slide stopper 10352 extended to the head of the guide rivet 1039 is disposed as described above, the second fixed stoppers 10353 and 10354 extended in the forward direction from the rivet rail 1029 corresponding to an area size of the second slide stopper 10352 may be constructed.

As described above, the mobile terminal 100 according to the present disclosure may adjust the size of a screen according to the need, thereby satisfying both portability and utility.

The mobile terminal 100 according to the present disclosure may prevent the display unit 151 from being damaged since stress is not concentrated at a specific point of the display unit 151.

The mobile terminal 100 may prevent the display unit 151 from being wavy when the second frame moves, that is, keep the flatness of the display unit 151 when the second frame moves.

The above-described embodiments are to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A mobile terminal whose size is variable in a first direction, the mobile terminal comprising:

a first frame;

a second frame slidable in the first direction or in a second direction opposite to the first direction with respect to the first frame;

a flexible display unit configured to be bent to surround a portion of the mobile terminal, wherein the flexible display unit includes a front surface located at a front surface of the mobile terminal and a rear surface located at a rear surface of the mobile terminal;

a slide frame slidable on a rear surface of the second frame in the first direction or the second direction corresponding to a slide movement of the second frame, wherein an end of the rear surface of the display unit is coupled to a rear surface of the slide frame; and a stopper configured to restrict a movement range of the slide frame in the first direction, wherein a size of the front surface of the flexible display unit is variable based on the slide movement of the second frame, wherein the stopper includes a fixed stopper located at the second frame and a slide stopper protruding from the slide frame, and wherein the slide stopper contacts the fixed stopper before the slide frame stops moving in the first direction.

2. The mobile terminal of claim 1, wherein the stopper includes:

a first slide stopper protruding from an end of the slide frame in a third direction perpendicular to the first direction; and a first fixed stopper positioned adjacent to the second frame in the first direction, wherein when the first slide stopper and the first fixed stopper come into contact with each other, the movement of the slide frame in the first direction is restricted.

3. The mobile terminal of claim 2, wherein the second frame includes a side portion positioned at an end thereof in the third direction and a slide rail formed on the side portion and extending in the first direction, wherein the slide frame includes a first slide hook inserted into the slide rail and moving along the slide rail, wherein the first slide stopper is located rearwardly of the first slide hook.

4. The mobile terminal of claim 3, further comprising a rolling hinge configured to support the display unit and bendable in the first direction corresponding to a bending of the display unit, wherein the rolling hinge includes, at an end thereof, a second slide hook inserted into the slide rail and moving along the slide rail.

5. The mobile terminal of claim 4, wherein the slide rail includes a pair of straight rails disposed so as to be spaced apart from each other in a thickness direction of the mobile terminal and a curved rail configured to connect the pair of straight rails to each other, wherein the first fixed stopper is more biased in the second direction than ends of the pair of straight rails in the first direction.

6. The mobile terminal of claim 2, wherein the second frame further includes a side frame covering a curved surface of the flexible display unit and positioned at an end in the first direction of the second frame, wherein the first fixed stopper is an end of the side frame in the second direction.

7. The mobile terminal of claim 1, further comprising:

a rivet rail formed on the second frame and extending in the first direction; and a guide rivet protruding from a front surface of the slide frame and moving along the rivet rail when the slide frame slides, wherein the stopper includes a second slide stopper more biased in the first direction than the guide rivet, wherein the second slide stopper restricts the movement of the slide frame in the first direction when in contact with an end of the rivet rail in the first direction.

8. The mobile terminal of claim 7, wherein the guide rivet includes:

a body having a diameter smaller than a width of the rivet rail; and a wing extended from an end of the body and having a diameter greater than the width of the rivet rail.

9. The mobile terminal of claim 8, wherein the second slide stopper protrudes in the first direction more than the wing, and further includes a second fixed stopper protruding in a forward direction of the mobile terminal at the end of the rivet rail in the first direction.

10. A mobile terminal having a variable size in a first direction, the mobile terminal comprising:

a first frame;

a second frame slidable in the first direction or in a second direction opposite to the first direction with respect to the first frame;

a flexible display unit configured to be bent to surround a portion of the mobile terminal, wherein the flexible display unit includes a front surface located at a front surface of the mobile terminal and a rear surface located at a rear surface of the mobile terminal;

a slide frame slidable on a rear surface of the second frame in the first direction or the second direction corresponding to slide movement of the second frame, wherein an end of the rear surface of the display unit is coupled to a rear surface of the slide frame; and a stopper configured to restrict a movement range of the slide frame in the first direction, wherein a size of the front surface of the flexible display unit is variable based on the slide movement of the second frame, wherein the stopper includes:

a first slide stopper protruding from an end of the slide frame in a third direction perpendicular to the first direction; and a first fixed stopper positioned adjacent to the second frame in the first direction, wherein when the first slide stopper contacts the first fixed stopper, movement of the slide frame in the first direction is restricted, wherein the second frame includes a side portion positioned at an end thereof in the third direction and a slide rail formed on the side portion and extending in the first direction, wherein the slide frame includes a first slide hook inserted into the slide rail and moving along the slide rail, wherein the first slide stopper is located rearwardly of the first slide hook.

11. The mobile terminal of claim 10, further comprising a rolling hinge configured to support the display unit and bendable in the first direction corresponding to bending of the display unit, wherein the rolling hinge includes, at an end thereof, a second slide hook inserted into the slide rail and moving along the slide rail.

12. The mobile terminal of claim 11, wherein the slide rail includes a pair of straight rails disposed so as to be spaced apart from each other in a thickness direction of the mobile terminal and a curved rail configured to connect the pair of straight rails to each other, wherein the first fixed stopper is more biased in the second direction than an end of the straight rail in the first direction.

13. The mobile terminal of claim 10, wherein the second frame further includes a side frame covering a curved surface of the flexible display unit and positioned at an end in the first direction of the second frame, wherein the first fixed stopper is an end of the side frame in the second direction.

14. A mobile terminal having a variable size in a first direction, the mobile terminal comprising:

a first frame;

a second frame slidable in the first direction or in a second direction opposite to the first direction with respect to the first frame;

a flexible display unit configured to be bent to surround a portion of the mobile terminal, wherein the flexible display unit includes a front surface located at a front surface of the mobile terminal and a rear surface located at a rear surface of the mobile terminal;

a slide frame slidable on a rear surface of the second frame in the first direction or the second direction corresponding to slide movement of the second frame, wherein an end of the rear surface of the display unit is coupled to a rear surface of the slide frame; and a stopper configured to restrict a movement range of the slide frame in the first direction, a rivet rail formed on the second frame and extending in the first direction; and a guide rivet protruding from a front surface of the slide frame and moving along the rivet rail when the slide frame slides, wherein a size of the front surface of the flexible display unit is variable based on the slide movement of the second frame, and wherein the stopper includes a second slide stopper biased further in the first direction than the guide rivet, wherein the second slide stopper restricts movement of the slide frame in the first direction when the second slide stopper contacts an end of the rivet rail in the first direction.

15. The mobile terminal of claim 14, wherein the guide rivet includes:

a body having a diameter smaller than a width of the rivet rail; and a wing extended from an end of the body and having a diameter greater than the width of the rivet rail.

16. The mobile terminal of claim 15, wherein the second slide stopper protrudes further in the first direction than the wing, and includes a second fixed stopper protruding in a forward direction of the mobile terminal at the end of the rivet rail in the first direction.

* * * * *